United States Patent
Christensen et al.

(10) Patent No.: US 9,800,426 B2
(45) Date of Patent: **\*Oct. 24, 2017**

(54) BROADCAST RESPONSE METHOD AND SYSTEM

(71) Applicant: StratosAudio, Inc., Kirkland, WA (US)

(72) Inventors: Kelly M. Christensen, Mill Creek, WA (US); Thomas Daniel Mock, Sheffield, PA (US); Lewis A. Kushner, Dublin, CA (US); Richard L. Bowman, Smyma, GA (US)

(73) Assignee: STRATOSAUDIO, INC., Kirkland, WA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/825,559

(22) Filed: Aug. 13, 2015

(65) Prior Publication Data

US 2015/0349904 A1 Dec. 3, 2015

Related U.S. Application Data

(63) Continuation of application No. 14/503,818, filed on Oct. 1, 2014, now Pat. No. 9,148,292, which is a
(Continued)

(51) Int. Cl.
*H04H 20/72* (2008.01)
*H04L 12/18* (2006.01)
(Continued)

(52) U.S. Cl.
CPC ........ *H04L 12/189* (2013.01); *G06K 19/0723* (2013.01); *G06Q 20/20* (2013.01);
(Continued)

(58) Field of Classification Search
CPC .............. H04L 12/189; H04L 12/1868; H04L 65/4076; H04H 60/33; H04H 60/37; H04H 60/76; H04W 4/06
(Continued)

(56) References Cited

U.S. PATENT DOCUMENTS

| 4,926,255 A | 5/1990 | Von Kohorn |
| 5,134,719 A | 7/1992 | Mankovitz |

(Continued)

FOREIGN PATENT DOCUMENTS

| CA | 2 316 925 | 7/1999 |
| DE | 44 27 046 A1 | 2/1996 |

(Continued)

OTHER PUBLICATIONS

"Bookmark Your World", 1999-2000 Xenote, www.xenote.com.
(Continued)

*Primary Examiner* — Sai-Ming Chan
(74) *Attorney, Agent, or Firm* — Knobbe Martens Olson & Bear LLP

(57) ABSTRACT

A system and method for broadcast response generally employing RDS, DARC, or similar technology is provided, including a method for responding to a broadcast comprising extracting an event identifier from a broadcast signal; detecting a response by a user to the broadcast signal; polling a communications device to determine a user identifier; and communicating the event identifier and the user identifier when the user response is detected.

20 Claims, 32 Drawing Sheets

Related U.S. Application Data continuation of application No. 13/493,860, filed on Jun. 11, 2012, now Pat. No. 8,892,458, which is a continuation of application No. 12/897,509, filed on Oct. 4, 2010, now Pat. No. 8,200,203, which is a continuation of application No. 10/806,084, filed on Mar. 22, 2004, now Pat. No. 7,917,130.

(60) Provisional application No. 60/456,995, filed on Mar. 21, 2003.

(51) Int. Cl.

| | | |
|---|---|---|
| *G06Q 20/20* | (2012.01) | |
| *H04H 60/33* | (2008.01) | |
| *H04H 60/37* | (2008.01) | |
| *H04H 60/76* | (2008.01) | |
| *H04W 4/06* | (2009.01) | |
| *G06K 19/07* | (2006.01) | |
| *H04L 29/06* | (2006.01) | |
| *H04H 60/40* | (2008.01) | |

(52) U.S. Cl.
CPC ............ *H04H 60/33* (2013.01); *H04H 60/37* (2013.01); *H04H 60/76* (2013.01); *H04L 12/1868* (2013.01); *H04L 65/4076* (2013.01); *H04W 4/06* (2013.01); *H04H 60/40* (2013.01); *H04H 2201/13* (2013.01)

(58) Field of Classification Search
USPC ........................................................ 470/312
See application file for complete search history.

(56) References Cited

U.S. PATENT DOCUMENTS

| | | | |
|---|---|---|---|
| 5,303,393 A | 4/1994 | Noreen et al. | |
| 5,438,355 A | 8/1995 | Palmer | |
| 5,444,769 A | 8/1995 | Koen et al. | |
| 5,539,635 A | 7/1996 | Larson, Jr. | |
| 5,548,828 A | 8/1996 | Kozaki et al. | |
| 5,557,541 A | 9/1996 | Schulhof et al. | |
| 5,579,537 A | 11/1996 | Takahisa | |
| 5,661,787 A | 8/1997 | Pocock | |
| 5,708,478 A | 1/1998 | Tognazzini | |
| 5,752,159 A | 5/1998 | Faust et al. | |
| 5,857,156 A | 1/1999 | Anderson | |
| 5,872,589 A | 2/1999 | Morales | |
| 5,903,617 A | 5/1999 | Kamalski | |
| 5,905,865 A | 5/1999 | Palmer et al. | |
| 5,907,793 A | 5/1999 | Reams | |
| 5,991,601 A | 11/1999 | Anderson | |
| 5,991,737 A | 11/1999 | Chen | |
| 6,035,177 A | 3/2000 | Moses et al. | |
| 6,036,086 A | 3/2000 | Sizer, II et al. | |
| 6,067,107 A | 5/2000 | Travaille | |
| 6,098,106 A | 8/2000 | Philyaw et al. | |
| 6,202,210 B1 | 3/2001 | Ludtke | |
| 6,286,140 B1 | 9/2001 | Ivanyi | |
| 6,446,262 B1 | 9/2002 | Malaure et al. | |
| 6,463,469 B1 | 10/2002 | Yavitz | |
| 6,473,792 B1 | 10/2002 | Yavitz et al. | |
| 6,507,727 B1 | 1/2003 | Henrick | |
| 6,578,047 B1 | 6/2003 | Deguchi | |
| 6,611,201 B1 | 8/2003 | Bishop et al. | |
| 6,658,232 B1 | 12/2003 | Johnson | |
| 6,701,355 B1 | 3/2004 | Brandt et al. | |
| 6,708,335 B1 | 3/2004 | Ozer et al. | |
| 6,725,022 B1 | 4/2004 | Clayton et al. | |
| 6,771,317 B2 | 8/2004 | Ellis et al. | |
| 6,829,486 B2 | 12/2004 | McKenna et al. | |
| 6,888,457 B2 | 5/2005 | Wilkinson et al. | |
| 6,928,423 B1 | 8/2005 | Yamanaka | |
| 6,941,154 B1 | 9/2005 | Ritter | |
| 6,957,041 B2 | 10/2005 | Christensen et al. | |
| 6,970,886 B1 | 11/2005 | Conwell et al. | |
| 6,987,734 B2 | 1/2006 | Hundemer | |
| 6,990,312 B1 | 1/2006 | Gioscia et al. | |
| 7,010,667 B2 | 3/2006 | Vorbach et al. | |
| 7,054,653 B2 | 5/2006 | Järvi et al. | |
| 7,088,950 B2 | 8/2006 | Tassberg et al. | |
| 7,110,714 B1 | 9/2006 | Kay et al. | |
| 7,149,541 B2 | 12/2006 | Rautila | |
| 7,158,753 B2 | 1/2007 | Kagan et al. | |
| 7,159,232 B1 | 1/2007 | Blackketter et al. | |
| 7,190,971 B1 | 3/2007 | Kawamoto | |
| 7,194,235 B2 | 3/2007 | Nykanen et al. | |
| 7,260,842 B2 | 8/2007 | Hirayama | |
| 7,266,343 B1 | 9/2007 | Yli-juuti et al. | |
| 7,299,194 B1 | 11/2007 | Manganaris et al. | |
| 7,313,359 B2 | 12/2007 | Steelberg et al. | |
| 7,313,360 B2 | 12/2007 | Steelberg et al. | |
| 7,319,863 B2* | 1/2008 | Engstrom ............. | G06Q 30/02 379/31 |
| 7,415,430 B2 | 8/2008 | Christensen et al. | |
| 7,415,526 B2 | 8/2008 | Hirayama | |
| 7,500,256 B1 | 3/2009 | Ohmae et al. | |
| 7,647,609 B2 | 1/2010 | Wachtfogel et al. | |
| 7,673,315 B1 | 3/2010 | Wong et al. | |
| 7,765,574 B1 | 7/2010 | Maybury et al. | |
| 7,773,939 B2 | 8/2010 | Christensen et al. | |
| 7,788,693 B2 | 8/2010 | Robbins | |
| 7,817,995 B2 | 10/2010 | Khurana et al. | |
| 7,917,130 B1 | 3/2011 | Christensen et al. | |
| 8,166,081 B2 | 4/2012 | Christensen et al. | |
| 8,200,203 B1 | 6/2012 | Christensen et al. | |
| 8,467,724 B2 | 6/2013 | Christensen et al. | |
| 8,516,017 B2 | 8/2013 | Christensen et al. | |
| 8,589,548 B2 | 11/2013 | Karaoguz et al. | |
| 8,631,448 B2 | 1/2014 | Christensen et al. | |
| 8,635,302 B2 | 1/2014 | Christensen et al. | |
| 8,688,028 B2 | 4/2014 | Christensen et al. | |
| 8,875,188 B2 | 10/2014 | Christensen et al. | |
| 8,892,458 B2 | 11/2014 | Christensen et al. | |
| 8,903,307 B2 | 12/2014 | Christensen et al. | |
| 9,143,833 B2 | 9/2015 | Christensen et al. | |
| 9,148,292 B2 | 9/2015 | Christensen et al. | |
| 9,294,806 B2 | 3/2016 | Christensen et al. | |
| 9,325,440 B2 | 4/2016 | Christensen et al. | |
| 9,355,405 B2 | 5/2016 | Christensen et al. | |
| 9,584,843 B2 | 2/2017 | Christensen et al. | |
| 2001/0001160 A1 | 5/2001 | Shoff et al. | |
| 2001/0031013 A1 | 10/2001 | Stetzler et al. | |
| 2002/0026474 A1 | 2/2002 | Wang et al. | |
| 2002/0046407 A1 | 4/2002 | Franco | |
| 2002/0133824 A1 | 9/2002 | Mensch | |
| 2002/0162118 A1 | 10/2002 | Levy et al. | |
| 2002/0178441 A1 | 11/2002 | Hashimoto | |
| 2003/0077065 A1 | 4/2003 | Scholten et al. | |
| 2003/0086694 A1 | 5/2003 | Davidsson | |
| 2003/0097338 A1 | 5/2003 | Mankovich et al. | |
| 2003/0105809 A1 | 6/2003 | Yoshii et al. | |
| 2003/0200543 A1 | 10/2003 | Burns | |
| 2003/0208756 A1 | 11/2003 | Macrae et al. | |
| 2004/0015704 A1 | 1/2004 | De Schrijver | |
| 2004/0205810 A1 | 10/2004 | Matheny et al. | |
| 2004/0260682 A1 | 12/2004 | Herley et al. | |
| 2004/0268403 A1 | 12/2004 | Krieger et al. | |
| 2004/0268407 A1 | 12/2004 | Sparrell et al. | |
| 2005/0020223 A1 | 1/2005 | Ellis et al. | |
| 2005/0021744 A1 | 1/2005 | Haitsuka | |
| 2005/0071223 A1 | 3/2005 | Jain et al. | |
| 2005/0166248 A1 | 7/2005 | Blackketter et al. | |
| 2006/0117040 A1 | 6/2006 | Begeja et al. | |
| 2006/0212921 A1 | 9/2006 | Carr | |
| 2007/0143777 A1 | 6/2007 | Wang | |
| 2007/0156457 A1 | 7/2007 | Brown | |
| 2007/0157257 A1* | 7/2007 | Kagan ................... | H04W 4/06 725/75 |
| 2008/0065507 A1 | 3/2008 | Morrison et al. | |
| 2008/0086754 A1 | 4/2008 | Chen et al. | |
| 2008/0155607 A1 | 6/2008 | Klappert | |
| 2008/0235746 A1 | 9/2008 | Peters et al. | |
| 2009/0104870 A1 | 4/2009 | Christensen et al. | |

(56) References Cited

U.S. PATENT DOCUMENTS

| | | |
|---|---|---|
| 2009/0104872 A1 | 4/2009 | Christensen et al. |
| 2009/0177736 A1 | 7/2009 | Christensen et al. |
| 2009/0192916 A1 | 7/2009 | Casper |
| 2011/0179453 A1 | 7/2011 | Poniatowski |
| 2013/0311278 A1 | 11/2013 | Christensen et al. |
| 2014/0115105 A1 | 4/2014 | Christensen et al. |
| 2015/0358684 A1 | 12/2015 | Christensen et al. |
| 2016/0205159 A1 | 7/2016 | Christensen et al. |
| 2016/0247199 A1 | 8/2016 | Christensen et al. |

FOREIGN PATENT DOCUMENTS

| | | |
|---|---|---|
| DE | 196 27 308 A1 | 1/1998 |
| EP | 0 713 335 A2 | 5/1996 |
| GB | 2346472 | 8/2000 |
| HK | 1150692 | 1/2012 |
| JP | 07-500715 | 1/1995 |
| JP | 08-139624 | 5/1996 |
| JP | 09-162818 | 6/1997 |
| JP | 09-163346 | 6/1997 |
| JP | 10-135855 | 5/1998 |
| JP | 10-163988 | 6/1998 |
| JP | 10-177532 | 6/1998 |
| JP | 10-257401 | 9/1998 |
| JP | 10-257455 | 9/1998 |
| JP | 2000-115093 | 4/2000 |
| JP | 2000-115094 | 4/2000 |
| JP | 2000-183835 | 6/2000 |
| JP | 2000-196547 | 7/2000 |
| JP | 2000-236306 | 8/2000 |
| JP | 2000292182 A | 10/2000 |
| JP | 2002-504775 | 2/2002 |
| KR | 10-1996-0033096 | 9/1996 |
| KR | 10-1998-0078248 | 11/1998 |
| WO | WO 90/00847 | 1/1990 |
| WO | WO 92/14222 | 8/1992 |
| WO | WO 94/02909 | 2/1994 |
| WO | WO 97/21291 | 6/1997 |
| WO | WO97/42724 | 11/1997 |
| WO | WO97/45814 | 12/1997 |
| WO | WO 99/18518 | 4/1999 |
| WO | WO 99/35771 | 7/1999 |
| WO | WO99/35809 | 7/1999 |
| WO | WO 99/43109 | 8/1999 |
| WO | WO 00/19662 | 4/2000 |
| WO | WO 00/78050 | 12/2000 |
| WO | WO 01/01331 | 1/2001 |
| WO | WO 01/22633 | 3/2001 |
| WO | WO 01/52541 | 7/2001 |
| WO | WO 01/57759 | 8/2001 |
| WO | WO 01/77779 | 10/2001 |
| WO | WO 02/23773 | 2/2002 |

OTHER PUBLICATIONS

"Sirius to Add 'Instant Buy' Button", Mar. 13, 2000, Twice, V 15, n 7, p. 28.

Australian App. No. 2007200471, Office Actions mailed on Oct. 15, 2008 and Jan. 12, 2009.

European Patent Office Examination Report dated Oct. 17, 2005.

European Patent Office Examination Report dated Feb. 21, 2007.

International Search Report dated Dec. 20, 2002.

Jan. 25, 2000, Showcase 2000—Xenote Press Release re Xenote iTag, www.xenote.com/html/press/releases.html.

Office Action in Canadian App. No. 2,421,165, mailed on Feb. 1, 2010.

Office Action in Japanese App. No. 2002-527094, mailed on Feb. 24, 2010 (both English and Japanese versions).

Office Action in Korean App. No. 10-2003-7003701, mailed on Feb. 29, 2008 (both English and Korean versions).

Office Action in Korean App. No. 10-2003-7003701, mailed on Sep. 20, 2007 (both English and Korean versions).

U.S. Appl. No. 15/404,075, Not yet published, Christensen.

U.S. Appl. No. 15/373,987, Not yet published, Christensen.

* cited by examiner

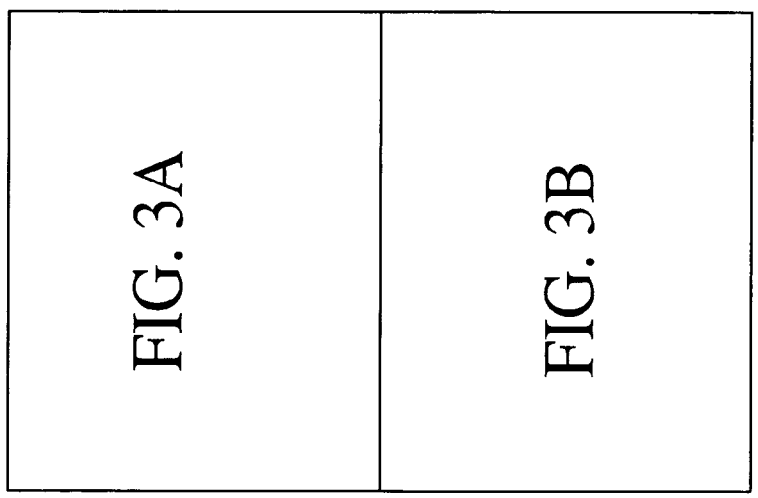

FIG. 3B

| Radio Text Event | Time |
|---|---|
| Ciquita Abba | 03/19 10:21:13 |
| Manic Monday Bangles | 03/19 10:18:07 |
| Moonlight Lifetime Press for a reminder | 03/19 10:17:51 |
| Bakersfield Twin Weekend Bud Light Press for 10% Off | 03/19 10:17:42 |
| Working My Way Spinners 1.50MP3 | 03/19 10:16:21 |
| This Old Heart of Mine Rod Stewart 2.50MP3 | 03/19 10:14:59 |
| Keep Me From The Cold Curtis Steigers 2.50MP3 | 03/19 10:13:58 |
| Too Late Too Soon John Secada 1.75MP3 | 03/19 10:12:35 |
| Bakersfield Twin Weekend Bud Light Press for 10% Off | 03/19 10:12:26 |
| Eyewitness News at 11 Eyewitness News Support Public TV | 03/19 10:12:19 |
| Mexico Jimmy Buffett 16.99CD | 03/19 10:11:15 |
| Let It Flow Toni Braxton 1.25MP3 | 03/19 10:09:51 |

138

Debug Log

| |
|---|
| 03/19 09:48:25-SOAP |
| 03/19 09:51:49-SOAP |
| 03/19 09:52:51-SOAP |
| 03/19 09:58:07-SOAP |
| 03/19 09:58:13-SOAP |

Running

SIGN UP & OPT-IN ─502

FIRST NAME: [         ]
LAST NAME: [         ]
PHONE NUMBER: [   ] [   ] [      ]    ext: [   ]
ADDRESS 1: [         ]
ADDRESS 2: [         ]
ADDRESS 3: [         ]
CITY: [         ]
STATE: [     ▼]
ZIP CODE: [     ]
COUNTRY: [     ▼]
AGE: [     ▼]
MARITAL STATUS: [   ▼]
GENDER: [  ▼]
HOUSEHOLD SIZE: [ ▼]
INCOME: [   ▼]
NOTIFICATION MESSAGE:
    ☐ WIRELESS CARRIER [       ]
    ☐ E-MAIL [       ]
    ☐ INTERNET SERVICE PROVIDER [       ]
BILL PURCHASES TO: [     ▼]
RECHARGE SIM: [       ]
VIEW"BUTTON PRESS"RESULTS [     ▼]

FIG. 10

Premium Interest:

```
                                            -504
┌─────────────────────────────────────────────────┐
│                                                 │
│  Premium Interest:                              │
│    ☐ Coupons      ☐ Product Samples             │
│    ☐ Prizes       ☐ Trial Programs              │
│                                                 │
│     CATEGORIES:                                 │
│         ☐ APPAREL                               │
│         ☐ BOOKS & MAGAZINES                     │
│         ☐ COMMUNICATIONS                        │
│         ☐ DINING                                │
│         ☐ ELECTRONICS & SOFTWARE                │
│         ☐ ENTERTAINMENT                         │
│         ☐ FAMILY & HOME                         │
│         ☐ FINANCE & INVESTMENT                  │
│         ☐ GIFTS                                 │
│         ☐ HEALTH & FITNESS                      │
│         ☐ PERSONAL LUXURY ITEMS                 │
│         ☐ SPORTS ACTIVITIES                     │
│         ☐ TRAVEL                                │
│                                                 │
│   REWARDS PROGRAM  [_____▼]  │
│                                                 │
│   USAGE          ALLOW TRACKING BY              │
│   TRACKING       ARBITRON, BILLBOARD, ECT.   ○ yes   ○ no │
│                                                 │
└─────────────────────────────────────────────────┘
```

FIG. 11

TICKET PROGRAM

506

CONCERT SETTINGS
- ZIP CODE
- FAVORITE VENUE
- FAVORITE SECTION
- FAVORITE ARTIST
- #SEATS
- PRICE RANGE
- PAYMENT METHOD

CONCERT ALERT NOTIFICATION
- ☐ VIA E-MAIL
- ☐ VIA WIRELESS
- ☐ VIA HYPERLINK

USAGE TRACKING
ALLOW TRACKING BY ARBITRON, BILLBOARD, ETC.    ○ yes    ○ no

FIG. 12

| FIG. 14 | FIG. 14A | FIG. 14B | FIG. 14C | FIG. 14D |

REAL TIME CHARTS & GRAPHS

CAMPAIGN NAME
RUN DATES [ ] TO [ ]
INCLUDE MARKETS
RADIO STATIONS
SUCCESS TO DATE
X,XXX RESPONSES
YYY BUYS

510

CREATE A CUSTOM REPORT

NAME YOUR REPORT
SELECT MARKET
SELECT RADIO STATION
SELECT TIME
SELECT DEMOGRAPHICS
PROGRAM EVENT
EVENT

| FIG. 15A | FIG. 15C | FIG. 15E |
|---|---|---|
| FIG. 15B | FIG. 15D | FIG. 15F |

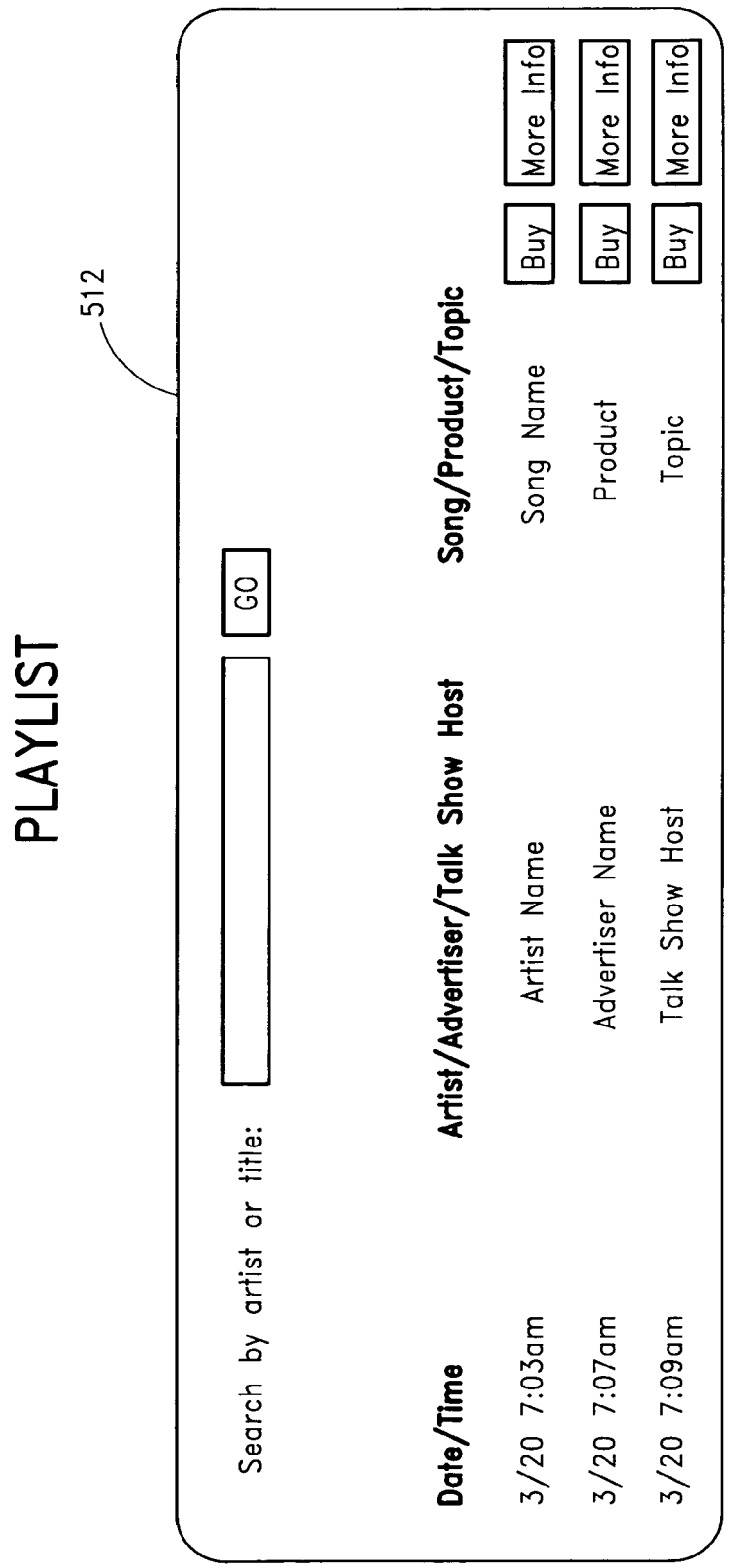

BROADCAST RESPONSE METHOD AND SYSTEM

CROSS-REFERENCE TO RELATED APPLICATIONS

This application is a continuation of U.S. application Ser. No. 14/503,818, filed Oct. 1, 2014, which is a continuation of U.S. application Ser. No. 13/493,860, filed Jun. 11, 2012, which is a continuation of U.S. application Ser. No. 12/897,509, filed Oct. 4, 2010, which is a continuation of U.S. application Ser. No. 10/806,084, filed Mar. 22, 2004, which claims the benefit under 35 U.S.C. §119(e) of U.S. Provisional Application No. 60/456,995, filed Mar. 21, 2003. Each of the foregoing applications is hereby incorporated by reference herein in its entirety.

BACKGROUND OF THE DISCLOSURE

Field of the Invention

This invention relates generally to a system and method for broadcast response.

Description of the Related Art

Broadcast transmissions often include ancillary signals such as background music or reading services for the blind along with a main carrier signal. The Radio Data System ("RDS") standard is an international standard that defines a basic FM subcarrier digital coding and transmission system. The most current and widely used data transmission standard in the United States is the Radio Broadcast Data Systems ("RBDS") standard. The RBDS standard defines how to implement the RDS standard in North America.

The RBDS standard, published by the National Radio Systems Committee and sponsored by the Electronic Industries Association and the National Association of Broadcasters, describes a system for broadcasting a variety of program-related information on a subcarrier of a standard FM broadcast channel. It was designed to allow stations to send information such as call letters, station format, traffic alerts and text messages to compatible radios.

RDS encoders generate what is known as a "subcarrier" that is transmitted along with an FM station broadcast signal and can be demodulated by special decoders. The RDS uses a subcarrier frequency of 57 khz. Commercially available RDS encoders usually accept information via either serial or parallel data ports and format the information into the appropriate RDS block type.

The RDS data signal is a specially encoded data stream containing up to 32 repeating "groups" and is transmitted at 1187.5 bits/second. The RDS data signal does not require inclusion of all potential data group blocks of both repeating and unique data. Certain embodiments include using one of several groups that are designed for data transmission functions.

An RDS data group is composed of 4 blocks, each divided by checkwords used for error correction. Block 1 is a 16-bit Program Identification code (PI) which contains a country symbol, a regional code, and a number which is derived from the transmitting station's call letters. Block 2 includes a 4-bit group type code and a 1-bit group version code that identifies the type of information the data group contains. This block also contains a 1-bit code that identifies the transmitting station as one that broadcasts traffic information, followed by a 5-bit Program Type (PTY) code which describes the current program or format being broadcast by the station (Rock, Oldies, Talk, News, etc.).

Information contained in Blocks 3 and 4 are dependent on the codes included in Block 2. Blocks 3 and 4 provide two 16-bit data slots where specific information can be sent to the special receiver. For example, RDS Group type 2A uses blocks 3 and 4 to transmit a segmented 64-character text message known as RadioText (RT). This appears on RDS-enabled radios as a message that some stations use to identify the song or program. Other group types use these blocks to identify alternate frequencies where the same programming can be available, in-house station text messages, or Emergency Alert System (EAS) communication messages. An extensive description of the RDS standard is available through the National Association of Broadcasters and the National Radio Systems Committee.

Broadcasters using the RDS standard can distribute information to a large number of users. However, the standard does not provide for individual users to respond to the broadcast information.

SUMMARY OF THE DISCLOSURE

Currently, users listening to the radio or watching television may desire to respond to programming or store information about the broadcast. While stations using RDS, DARC (Data Radio Channel) or other similar technology may provide a user with the station call letters or the name of the song currently being broadcast, the user's options for data storage and communicative response are limited. Increased data capture and storage at the user's end, combined with an improved system for transmitting data from the user's end, can lead to improved response to polls, surveys, etc.

In one embodiment, a method for responding to a broadcast comprises extracting an event identifier from a broadcast signal; detecting a response by a user to the broadcast signal; polling a communications device to determine a user identifier; communicating the event identifier and the user identifier when the user response is detected.

In another embodiment, the user response corresponds to the user tuning into a broadcast frequency. In another embodiment, a time corresponding to a time of broadcast is communicated. In another embodiment, a time corresponding to a time of user response is communicated. In another embodiment, the user identifier corresponds to a network address. In another embodiment, the user identifier corresponds to a telephone number. In another embodiment, the user identifier corresponds to a credit card. In another embodiment, the user identifier corresponds to a vehicle identification number. In another embodiment, the communications device is wireless.

In one embodiment, a method for broadcasting data, comprises receiving content information; comparing the content information with entries in a database to determine a broadcast data packet; validating the contents of the data packet for accuracy; and broadcasting the data packet over a subcarrier channel.

In another embodiment, the content information indicates a title of a first song being broadcast over a main broadcast channel, and the broadcast data packet identifies a second song selected from the same music genre. In another embodiment, the content information has a first set of field types, the database has a second set of field types, and the first set of field types and second set of field types have at least a first field type in common. In another embodiment, the first set of field types is a subset of the second set of field types. In another embodiment, the comparing comprises comparing a first data element from the content information having the first field type with a second data element from a first entry in the database having the first field type. In another embodiment, the broadcast data packet corresponds to the first entry in the database. In another embodiment, the broadcast data packet corresponds to a second entry in the database, wherein none of the elements of the second entry match any of the elements of the content information, but at least one element of the second entry matches at least one element of the first entry, and at least one element of the content information matches at least one element of the first entry. In another embodiment, a plurality of entries in the database match with the content information, and the broadcast data packet is selected randomly from the plurality of matches. In another embodiment, the broadcast data packet is broadcast a plurality of times. In another embodiment, the broadcast data packet is broadcast prior to a corresponding broadcast event on a main broadcast channel. In another embodiment, the broadcast data packet comprises a reference to a download location. In another embodiment, the broadcast data packet indicates that a selection from a plurality of possible responses is requested. In another embodiment, the method further comprises transmitting a user response derived from the broadcast data packet. In another embodiment, the user response comprises an identifier extracted from the broadcast data packet. In another embodiment, the user response comprises modification of an identifier extracted from the broadcast data packet. In another embodiment, the broadcast data packet comprises a component of a destination location for a user response. In another embodiment, the component is an IP number. In another embodiment, the component is a file structure location. In another embodiment, the component is compressed. In another embodiment, the broadcast data packet comprises a type indicator and a broadcast event identifier. In another embodiment, the type indicator indicates an update for a download location. In another embodiment, the type indicator indicates an event having a plurality of possible responses.

In one embodiment, a method for tracking user response to a broadcast comprises broadcasting at least one event identifier over a subcarrier channel, receiving at least one data packet from a broadcast receiver in response to the at least one broadcast event identifier, and providing a summary of the received at least one data packet.

In another embodiment, the at least one data packet was received without user initiation. In another embodiment, the at least one data packet is tracked according to user, and a user is rewarded for the receipt of the at least one data packet. In another embodiment, the at least one data packet was forwarded by a first user to a second user, and the first user is rewarded for the receipt of the at least one data packet.

BRIEF DESCRIPTION OF THE DRAWINGS

These and other features will now be described with reference to the drawings summarized below. These drawings and the associated description are provided to illustrate one or more preferred embodiments of the invention, and not to limit the scope of the invention.

FIG. 10 shows a sign-up interface for entering user information.

FIG. 11 shows an interface for selecting user interests.

FIG. 12 shows an interface for customizing a ticket purchase program for a user.

FIG. 16 shows an exemplary interface for viewing a playlist.

DETAILED DESCRIPTION

Although certain preferred embodiments and examples are disclosed below, it will be understood by those of ordinary skill in the art that the invention extends beyond the specifically disclosed embodiments to other alternative embodiments and uses of the invention and obvious modifications and equivalents thereof. Thus, the particular embodiments described below are not intended to limit the scope of the invention herein disclosed.

The present patent application hereby incorporates by reference the entirety of the contents of U.S. Provisional Application No. 60/232,333, filed Sep. 13, 2000, titled "SYSTEM AND METHOD FOR ORDERING AND DELIVERING MEDIA CONTENT," and U.S. patent application Ser. No. 09/953,335, filed Sep. 13, 2001, titled "SYSTEM AND METHOD FOR ORDERING AND DELIVERING MEDIA CONTENT."

Figure 1:
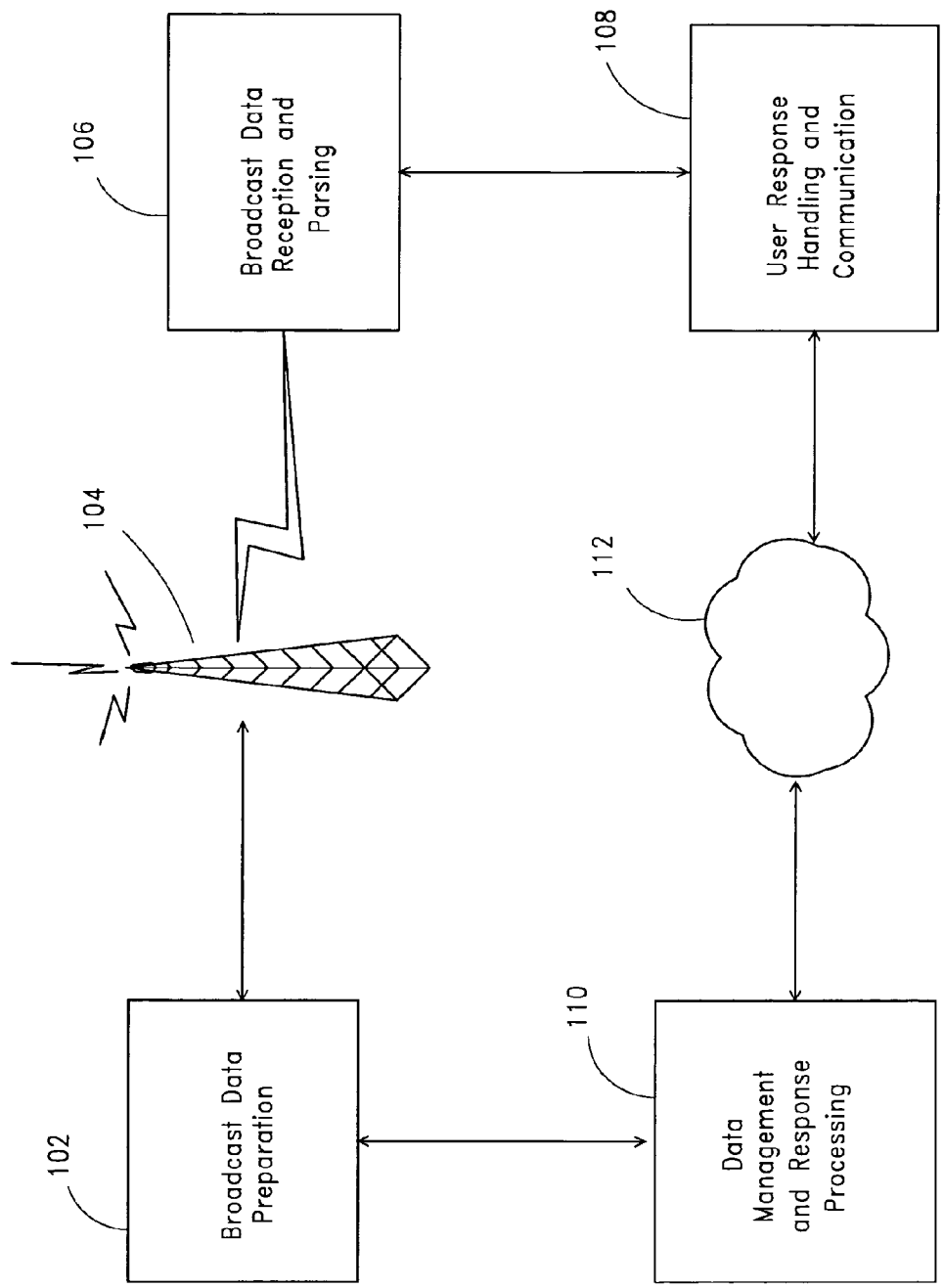
FIG. 1 illustrates a high-level overview of a broadcast response system.

FIG. 1 illustrates an exemplary high-level overview of a broadcast response system. As illustrated, a broadcast data preparation module 102 is in communication with a broadcast system 104. The broadcast data preparation module 102 prepares data for broadcast transmission. In one embodiment, the prepared data contains information pertaining to the main broadcast signal. For example, data containing the title of a song or name of an artist may be broadcast in concert with a music piece. Ads may also be identified in a similar fashion. Other information pertaining to the main broadcast signal may include data such as a purchase price, a purchase location or a unique identifier. The prepared data, however, is not required to pertain to the main broadcast signal. Commercial advertisements unrelated to the main signal are an example of broadcast data that may not directly correspond to the main broadcast signal.

In one embodiment, the broadcast system 104 transmits the data using a subcarrier signal. For example, the broadcast system 104 may transmit data in conformance with the RDS standard, the RBDS standard, the DARC standard, or other appropriate formats. Although many of the embodiments disclosed herein specifically refer to the RDS standard, it is to be understood other embodiments may use different formats, such as the RBDS standard, the DARC standard, or other implementations for broadcasting. Further, many of the embodiments disclosed herein specifically refer to radio, but it is to be understood that other broadcast formats such as television broadcasts are also within the scope of this disclosure.

A broadcast reception module 106 receives broadcast transmissions from the broadcast system 104 and extracts the transmitted data. The extracted data may then be used, for example, to display information such as the title of the song or name of the artist to a user.

A user response module 108 detects responses by a user. For example, the user response module 108 may detect a user pressing a button in response to data transmitted by the broadcast system 104. Other user responses may include, for example, tuning into a different broadcast signal, turning a device on or off, adjusting the broadcast signal volume, pressing a touch screen, entering keypad data, issuing instructions by speaking, or issuing instructions using eye motion commands. In a preferred embodiment, the user initiates an information request for a broadcast program by pressing a button during the broadcast or by recalling stored data at a later time.

FIG. 1 further illustrates the user response module 108 being in communication with a data management module 110. In one embodiment, the communication occurs over a network 112 such as a wide-area network (WAN). The data management module 110 is also in communication with the broadcast data preparation module. This allows synchronization of the user generated responses from the user response module 108 with the broadcast data generated from the broadcast data preparation module 102.

The high-level overview illustrated in FIG. 1 partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations (e.g., network, serial interface, parallel interface, or internal bus), software implementations (e.g., database, DDE (Dynamic Data Exchange), function call), or a combination of hardware and software. Further, the modules may be realized using state machines, microcode, microprocessors, digital signal processors, or any other appropriate digital or analog technology.

The following describes an exemplary embodiment wherein a radio station uses the broadcast system 104. The radio station generates programming data in conjunction with the broadcast signal. The radio station communicates the programming data to the broadcast data preparation module 102. In this exemplary embodiment, the broadcast data preparation module 102 comprises a database that contains entries corresponding to the programming data. In certain embodiments the data is formatted and sent to a database. In certain embodiments the data is formatted and sent to a database.

The broadcast data preparation module 102 provides a unique identifier for the programming data to the radio station. The broadcast data preparation module 102 may also provide additional information about the program to the radio station. The radio station broadcasts the unique identifier and any other desired information using the RDS subcarrier. A radio, using the broadcast data reception module 106, extracts the unique identifier from the RDS subcarrier. When a user presses a button indicating that the user desires to obtain additional information regarding content corresponding to the broadcast, the user response module 108 communicates the unique identifier and a user identifier to the data management module 110. The data management module 110 looks up the unique identifier and user identifier in a database, and uses this information to fulfill the order. This presently preferred embodiment is exemplary only, and further details regarding this and other embodiments are set forth below.

Broadcast Data Preparation

Figure 2:
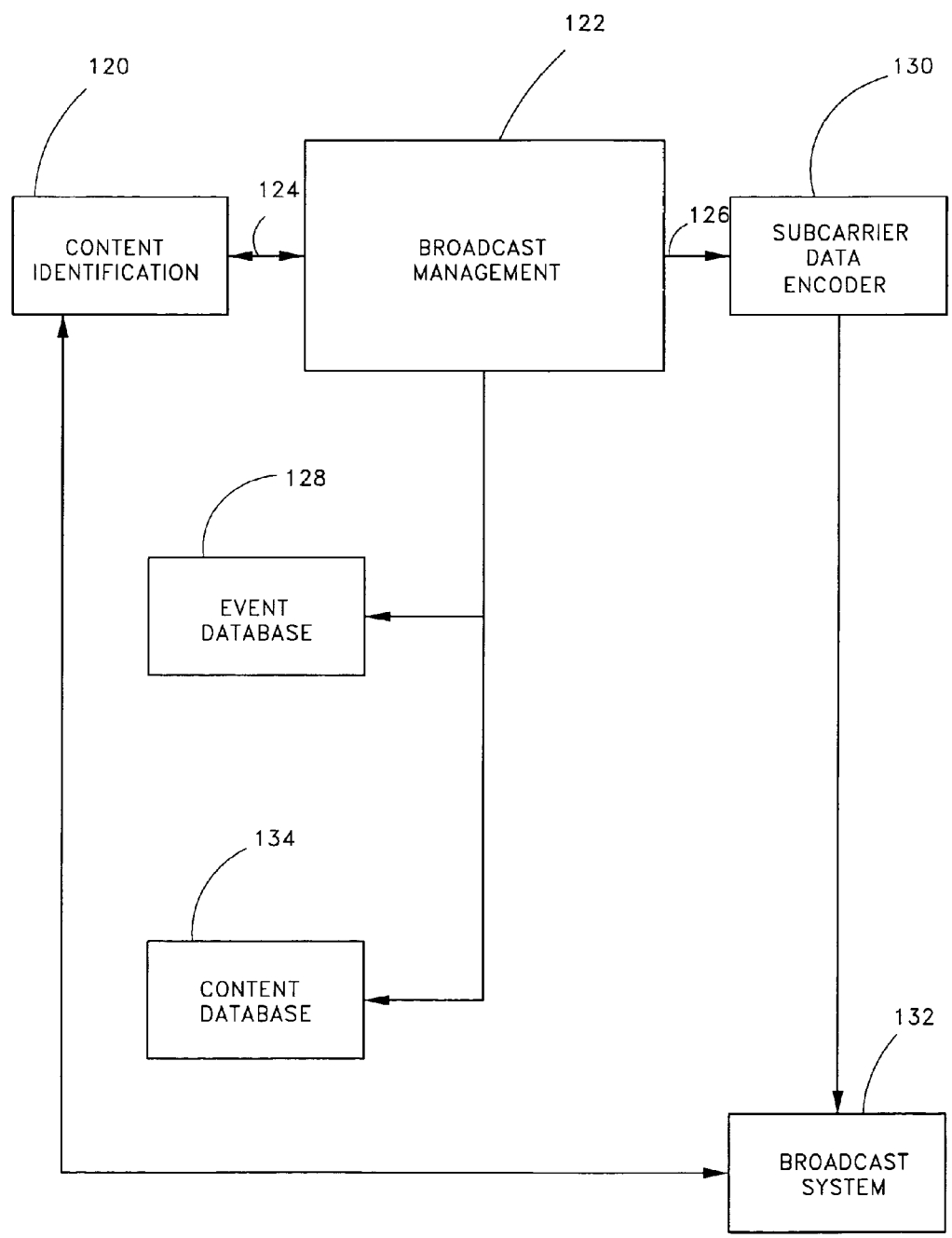
FIG. 2 illustrates an exemplary overview of a system for preparing data for transmission over a subcarrier channel.

FIG. 2 shows an exemplary overview of a system for preparing data for transmission over a subcarrier channel. The process begins with a content identification module 120, which extracts information used to correlate content with the unique identifier. This identifying information may include, for example, the title, artist, radio station, program, sponsor, or advertising campaign.

In one embodiment, the content identification module 120 automatically extracts content information 124 from a playlist. For example, the content identification module 120 may include a radio automation system that extracts information about songs or a radio program from the station playlist. In another embodiment, the content identification module 120 uses a media playback system to automatically extract content information 124 encoded on media, such as the identification codes or track numbers on a CD-ROM. Other embodiments of the content identification module 120 may provide a user interface for manually entering content information 124.

Music radio stations often depend on playlists to ensure consistency and success of the format. Many stations use computer-based playback systems that play from hard disc libraries or control CD changers. A compiled playlist includes information or cue sheets for the songs to be aired, advertisements to be run, or other content to be broadcast. These "automation" systems provide continual logging of functions and activities and can output the "as played" information in a variety of ways, such as serial data. Data can be taken as an event occurs or can be read from a text file. Most automated systems can be programmed to send information out of the serial port or to an IP data packet.

Some stations may route this data through the subcarrier using RDS, thus displaying song information in the Radio-Text or PS (Program Service Name) groups. Stations may also use this information to feed a "now playing" message on Internet web sites.

Even stations that play CDs manually from a paper playlist can provide the information needed. Professional CD players usually have serial ports (i.e., RS232, RS485) that can be programmed to transmit CD code information. This code information is similar to the song codes used by internet-enabled computers to automatically download song information from the website known as CDDB.com for a CD inserted into a CD-ROM player. RIAA (Recording Industry Association of America) registered CDs contain registration codes that can be used in combination with the track length or number of tracks to identify content. Thus, on a RIAA registered CD, a song can be identified by the registered code number in combination with the track number. In one embodiment, the broadcaster providing the service to its listeners assigns an identifier code to the content. In another embodiment, an identifier code is provided by a registering organization or service. In yet another embodiment, RIAA, CDDB or other identifiers are stored in the content database and are used in whole or in part to create an identifier. In another embodiment, RIAA, CDDB or other identifiers assist in the verification of text or other data within a database.

The content identification module 120 communicates content information 124 to the broadcast data management module 122. The broadcast data management module 122 uses the content information 124 to select appropriate data 126 for inclusion in the broadcast. Some examples of content information 124 communicated by the content identification module 120 to the broadcast data management module 122 may include title, artist, cut number, spot, client, advertisement identification such as Ad-ID, or Industry Standard Coding Identification (ISCI) as issued by the American Association of Advertising Agencies.

Further, it is not necessary to have a one-to-one correlation between the content information 124 and the data selected for broadcast. It may be desirable to communicate information about content to an algorithm that then determines appropriate data for broadcasting over the subcarrier frequency. For example, for a given artist, the algorithm may choose to broadcast information about products from similar artists or other products by the given artist. Alternatively, the algorithm may use the program information to select an advertisement campaign from a database of currently active advertisement campaigns. The algorithm may incorporate routines for randomly selecting the broadcast data 126.

The broadcast data management module 122 may provide broadcast data 126 without receiving content information from the content identification module 120. This is particularly useful for emergency alert or traffic information. The broadcast data management module 122 may send alerts to the full network of broadcast systems, or to localized broadcasts systems, depending on the nature of the warning or message. The broadcast data management module 122 may also initiate transmission of broadcast data 126 as part of an advertisement campaign.

The broadcast data management module 122 typically communicates with an event database 128 to track the content information 124 and the broadcast data 126. The event database 128 may include information such as a broadcast event identifier, descriptive information about the broadcast event, time that the broadcast occurred, or the station that transmitted the broadcast. The broadcast event identifier provides a simple way of matching user responses with broadcast events.

In addition to the event database 128, the broadcast data management module 122 may also communicate supplemental information to aid in identifying a broadcast event. For example, one content identification module 120 may identify a broadcast event by album and cut number. Another content identification module 120 may identify a broadcast event by artist and title. Yet another content identification module 120 may identify a broadcast event by the record label. Providing supplemental database information allows the normalization of various formats of content information 124 into a standard format.

In one embodiment, the broadcast data management module 122 uses a content database 134 to store information about known content. The content database may include information such as artist, album, label, year, track titles, composer, availability, popularity, amount of air time, or digital storage locations. A new entry may be created in real time for items not listed in the database.

Figure 3A:
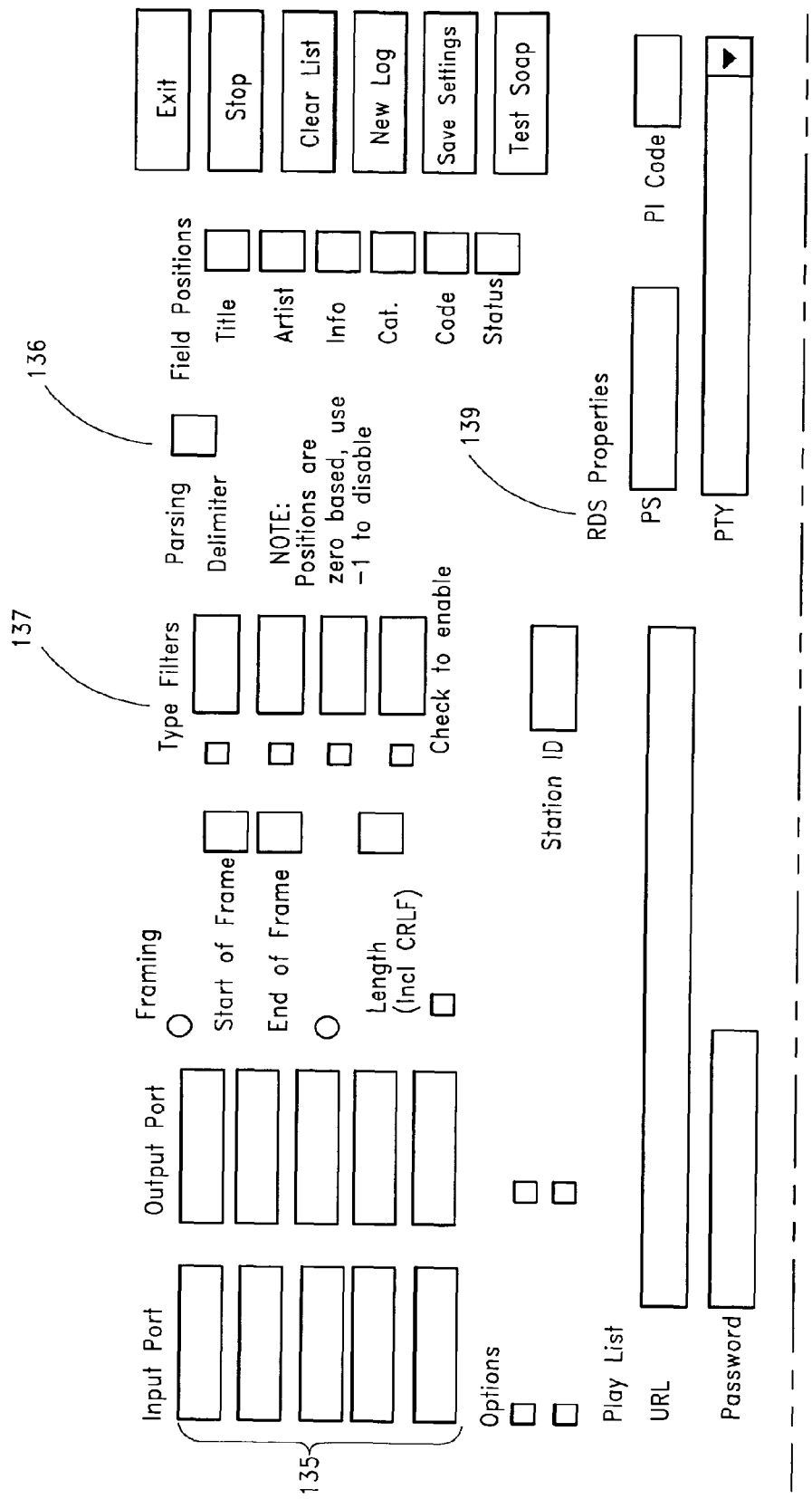
FIG. 3 (shown across FIGS. 3A and 3B) illustrates an exemplary graphical user interface.

The broadcast data management module 122 may provide a graphical user interface, a command line interface, or other mechanisms for controlling the flow of data to the database. FIG. 3 shows an exemplary graphical user interface. As illustrated, the broadcast data management module 122 may provide controls 135 for input and output ports, controls 136 for data parsing, controls 139 for modifying or injecting various elements of the RDS data stream such as PS or PTY, or controls 137 for data type filtering. Events may be stored in the event database 128 for use with a reporting server or fulfillment server, as well as being displayed 138 in the user interface.

In one embodiment, the broadcast data management module 122 operates in the same location as the automation software. In another embodiment, the automation software communicates with the broadcast data management module 122 over a network. The automation software may transmit, for example, SOAP/XML (Simple Object Access Protocol/Extensible Markup Language) data packets to a remote server. The server, running broadcast data management module 122, would then provide, for example, a broadcast event identifier in UECP (Universal Encoder Communication Protocol) compliant format to the IP port of an encoder.

Returning to FIG. 2, the broadcast data 126 may include a unique identifier that corresponds to a broadcast event as communicated by the content information 124. The broadcast data management module 122 generates the unique identifier, which, for example, may be random, or may be based in part on time of creation or type of broadcast event. In one embodiment, the unique identifier includes elements from the RDS standard, such as the PI code. The broadcast data 126, including the unique identifier, is then provided to a subcarrier data encoder 130. The subcarrier data encoder 130 prepares the data for broadcast using a broadcast system 132. The broadcast system 132 may synchronize the encoded broadcast data 126 with information from the content identification module 120.

In one embodiment, the sub carrier data encoder 130 conforms to the RDS standard. In another embodiment, the subcarrier data encoder 130 conforms to the DARC standard. In yet another embodiment, the subcarrier data encoder 130 conforms to the DAB (Digital Audio Broadcasting) standard. Other ways of encoding the data are also feasible. Many of the exemplary embodiments disclosed herein use the RDS standard for ease of description. It is to be understood, however, that other types of data communication, including television, digital radio, satellite, or streaming content, are also within the scope of the disclosure.

As an example of a data protocol for encoding the broadcast data 126, the subcarrier data encoder 130 may use the RDS standard. The RDS standard generally defines the format for transmission of data. The standard also includes the capability for customization of broadcast packets for a particular application using Open Data Applications, although Open Data Applications are not explicitly defined by the standard.

The RDS standard uses groups that are 104 bits long to communicate data to a receiver. The format of each group of 104 bits is defined by 5 of those bits. These 5 bits are capable of identifying 32 different types of groups. The groups of 104 bits are typically partitioned into 4 blocks of 26 bits each. The group type may define in part the format for the blocks.

The first block contains the program identification ("PI") code, and is not affected by the group type. The program identification codes provide the source of the broadcast. The program identification code may include information about the country, program type in terms of area coverage, or a program reference number. In the United States, the program identification codes are calculated using station call letters, and the coverage area codes are not used.

Figure 4:
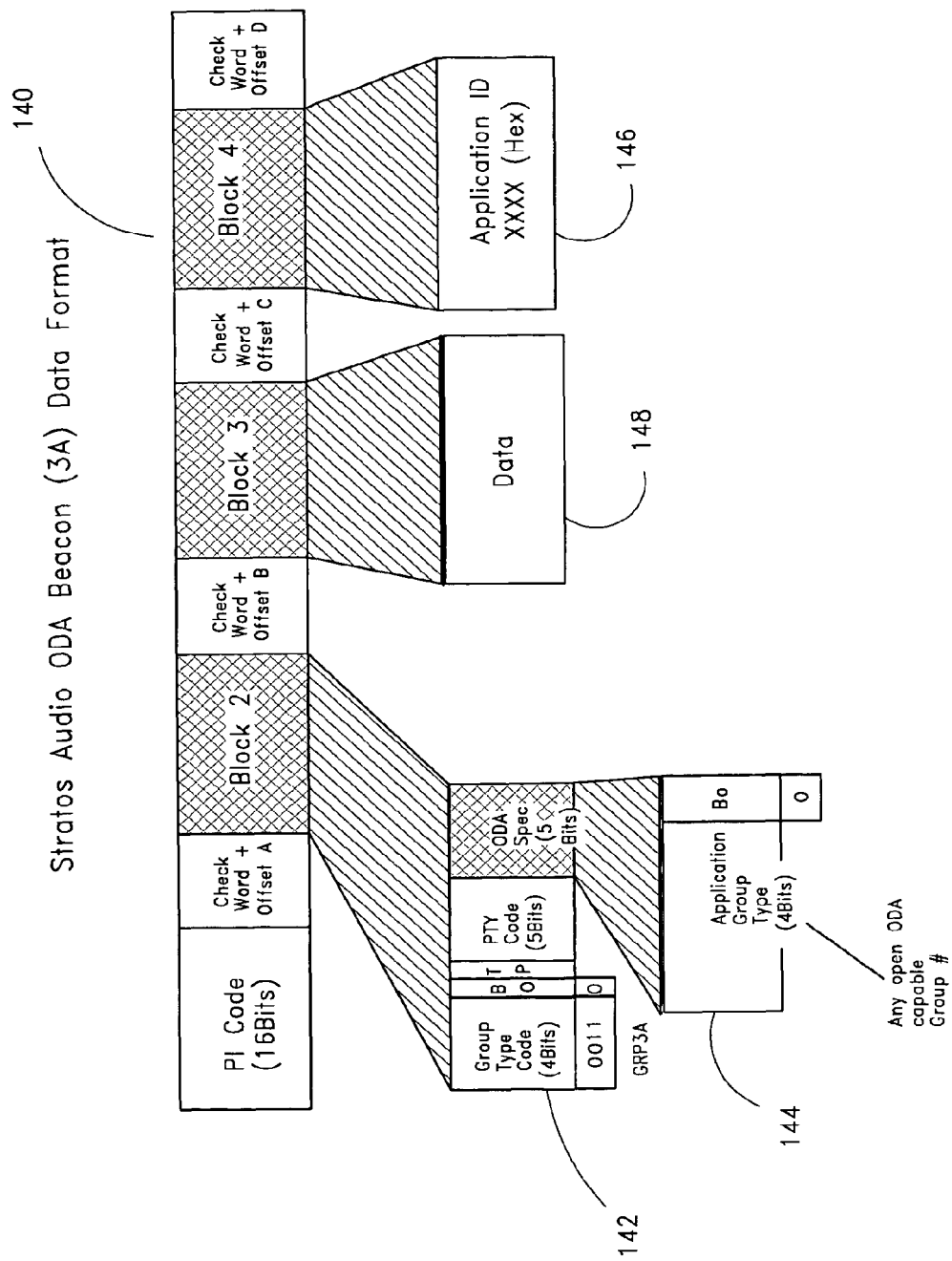
FIG. 4 illustrates an example of a type 3A group as defined by the RDS standard.

FIG. 4 illustrates an example of a type 3A group 140 as defined by the RDS standard. Using the format of group type 3A 140, the subcarrier data encoder 130 can convey information to a receiver about Open Data Applications carried on a particular transmission and in which groups they will be found. The 5-bit group type 142 includes 4 type bits and a version bit. In the illustrated example, the 4 type bits "0011" represents group type 3, and the version bit "0" represents version A. Hence, a group having a 5-bit group type of "00110" is referred to as group type 3A.

The group type 3A 140 includes a five-bit Application Group type code 144. The 5-bit Application Group type code 144 includes 4 type bits and a version bit. The Application Group type code 144 indicates the group type used, in the particular transmission, to carry the specified Open Data Application. For example, an Application Group type code of "10110" indicates that the broadcast data 126 will be located in group type 11A. The receiver would then look for and decode the 11A groups to extract the broadcast data 126.

The group type 3A 140 also includes a 16-bit Application Identification Code ("AID") 146. The subcarrier data encoder 130 uses the Application Identification Code 146 to identify the transmitted data as containing broadcast data 126. Thus, a receiver can monitor the Application Identifier Code 146 to determine when a group contains the broadcast data 126.

The subcarrier data encoder 130 may use the block 3 data bits when the bits are non-zero. This allows a total of 53 bits for data. The 16 bits can precede or follow the 37 bits. If the data can fit within the 16 bits, then the 3A group does not "point" to another data group. All of the data is contained within the one group. This makes more efficient use of the bandwidth.

Figure 5:
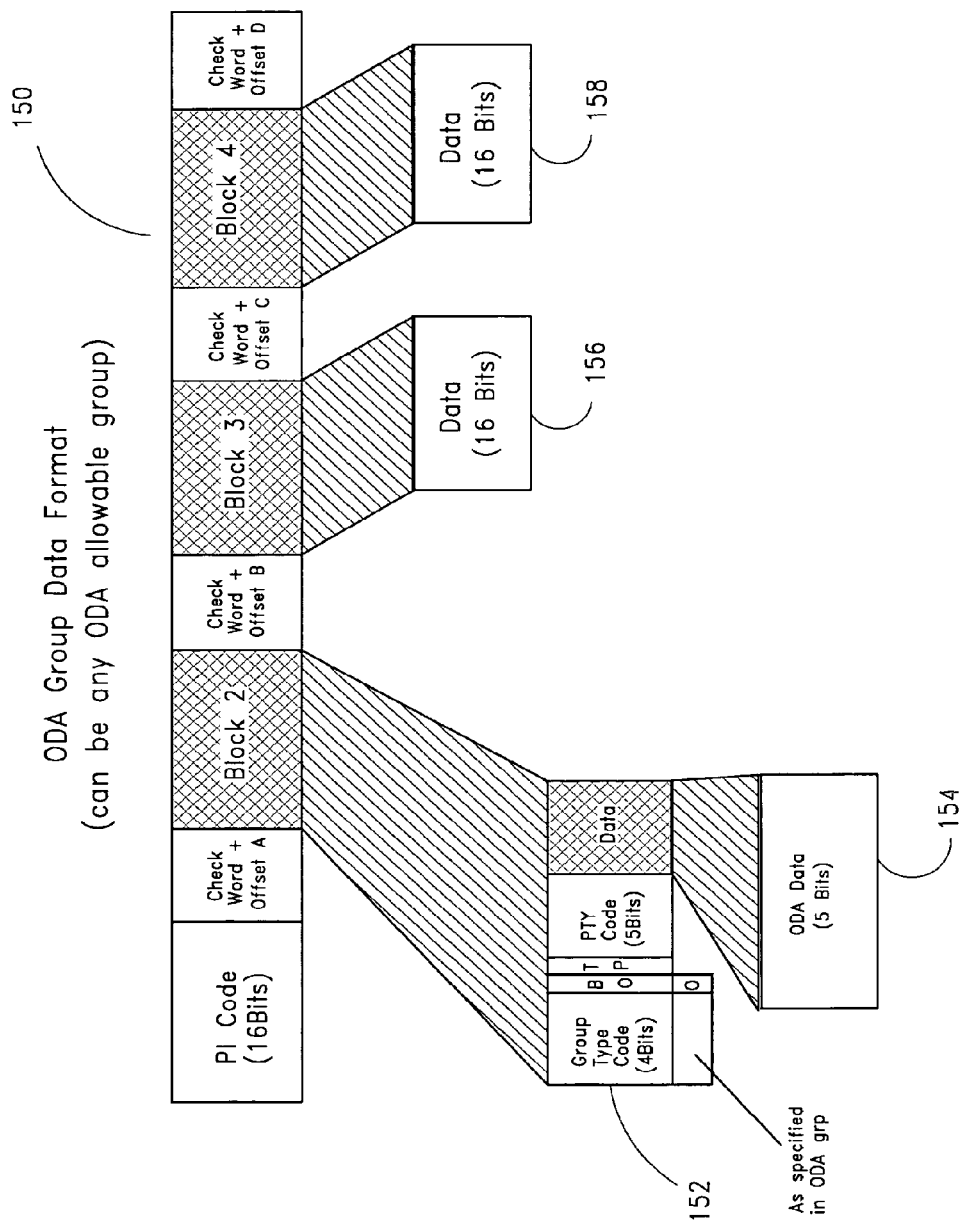
FIG. 5 illustrates the format for an ODA (Open Data Application) group.

FIG. 5 illustrates the format for an ODA group 150. A group type code 152 of the ODA group 150 is associated with a corresponding Application Group type code 142 (FIG. 4) from a group type 3A 140. As illustrated, there are 5 data bits 154 available in block 2, 16 data bits 156 available in block 3, and 16 data bits 158 available in block 4. In addition, if the 16 data bits 148 of block 3 of the corresponding group type 3A are non-zero, they can be used as additional data bits.

Figure 6:
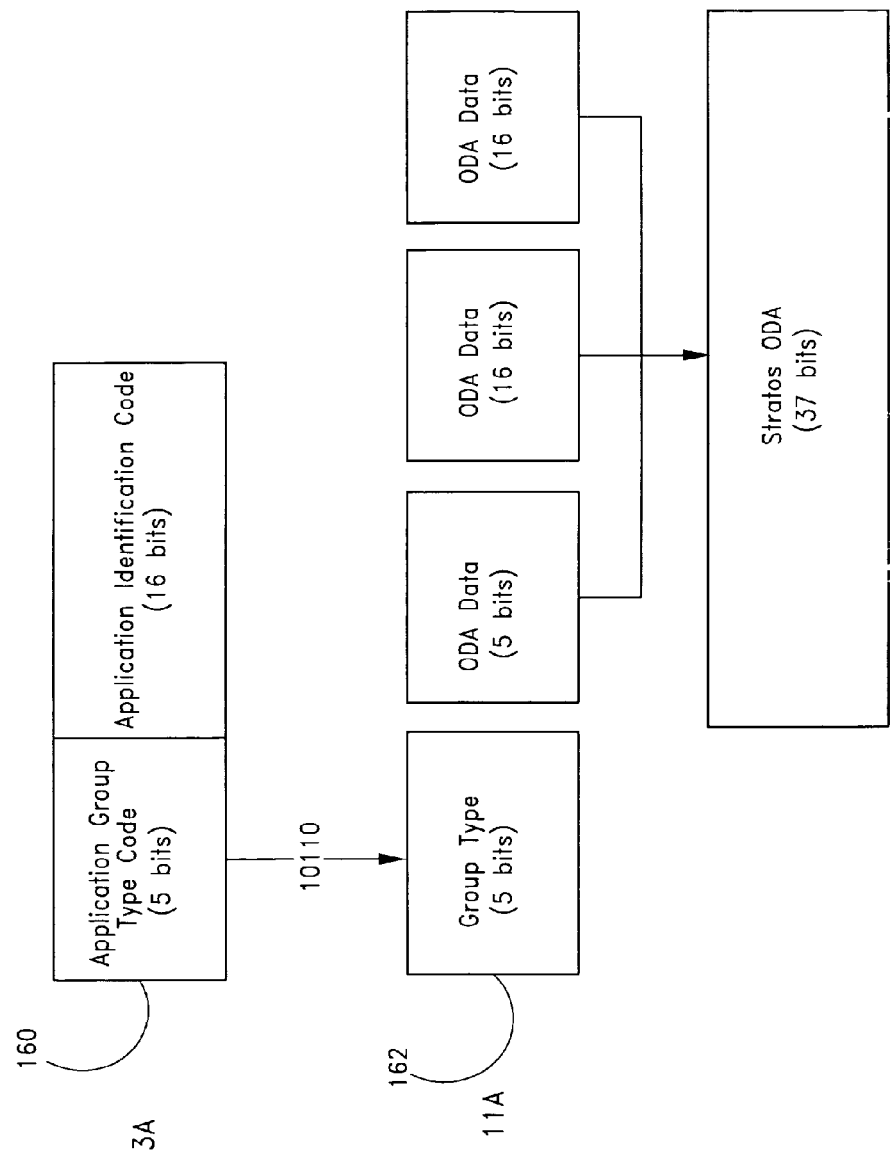
FIG. 6 shows an example of a group type 3A.

FIG. 6 shows an example of a group type 3A 160, such as the one shown in FIG. 4, used with a corresponding group type 11A 162, such as the one shown in FIG. 5.

The broadcast data 126 may be transmitted one or more times. In a preferred embodiment, the broadcast data 126 is periodically repeated to allow users tuning in after the start of the broadcast event the ability to receive the broadcast data 126. For example, transmitting the data once a second allows users to capture the broadcast data 126 without using excessive amounts of bandwidth. Further, the content identification module 120 may be synchronized with the broadcast to provide a "pre announce" function for upcoming broadcast events.

A radio station can broadcast data regarding the current song or advertisement that is playing, such as the song title, artist or manufacturer, album name or product, and year the song was recorded. The radio station can also broadcast information providing a location where the song, editorial news broadcast, collection of songs, or other program material can be downloaded or purchased, and the purchase price for the song.

Additionally, the broadcast data 126 may include instructions, an Internet address, alias or phone number for the location of a look up table used to reference the location of downloadable audio. Once the content data source is identified, the information is also stored in a "look up" table. The codes representing "cut numbers", or text song information such as artist and song title, are referenced against the internal look up table to determine if the song is available for download from a content provider such as a distributor, music publisher or record company. Once determination has been made regarding availability of the requested content, the broadcast data 126 is formatted so that the RDS data contains the directions to or address of, the look up table which points to the download location and/or file name.

The capabilities of the RDS Open data Application allow for the inclusion of an Internet IP address and directory location for routing the request for purchase from a user to the appropriate download site such as a publisher, record company or news organization. In another embodiment, the broadcast data 126 contains a reference code for retrieving the download location from a lookup table. The results of querying the look up table may be returned to a location such as a website or wireless phone as declared by the user when they established their service. This information is stored in a consumer database. The results may then be forwarded to the selected location such as a website, email address or cell phone number as a text message for review and redemption.

Broadcast Data Reception

Figure 7:
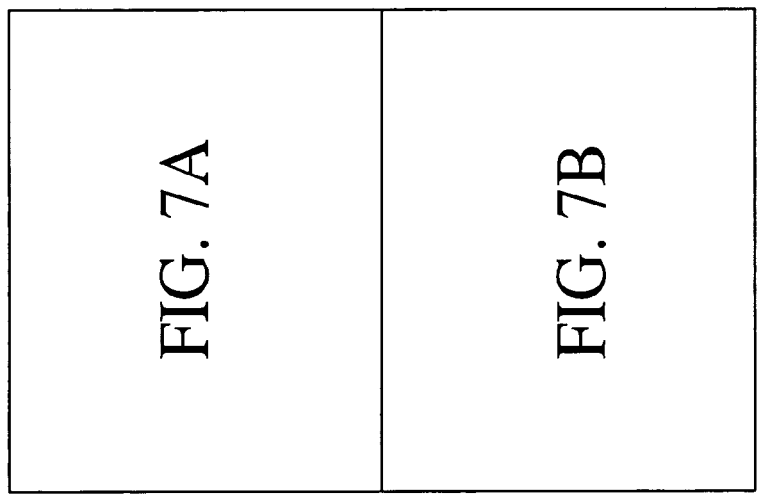
FIG. 7 (shown across FIGS. 7A and 7B) illustrates an example of a broadcast receiver.
Figure 7A:
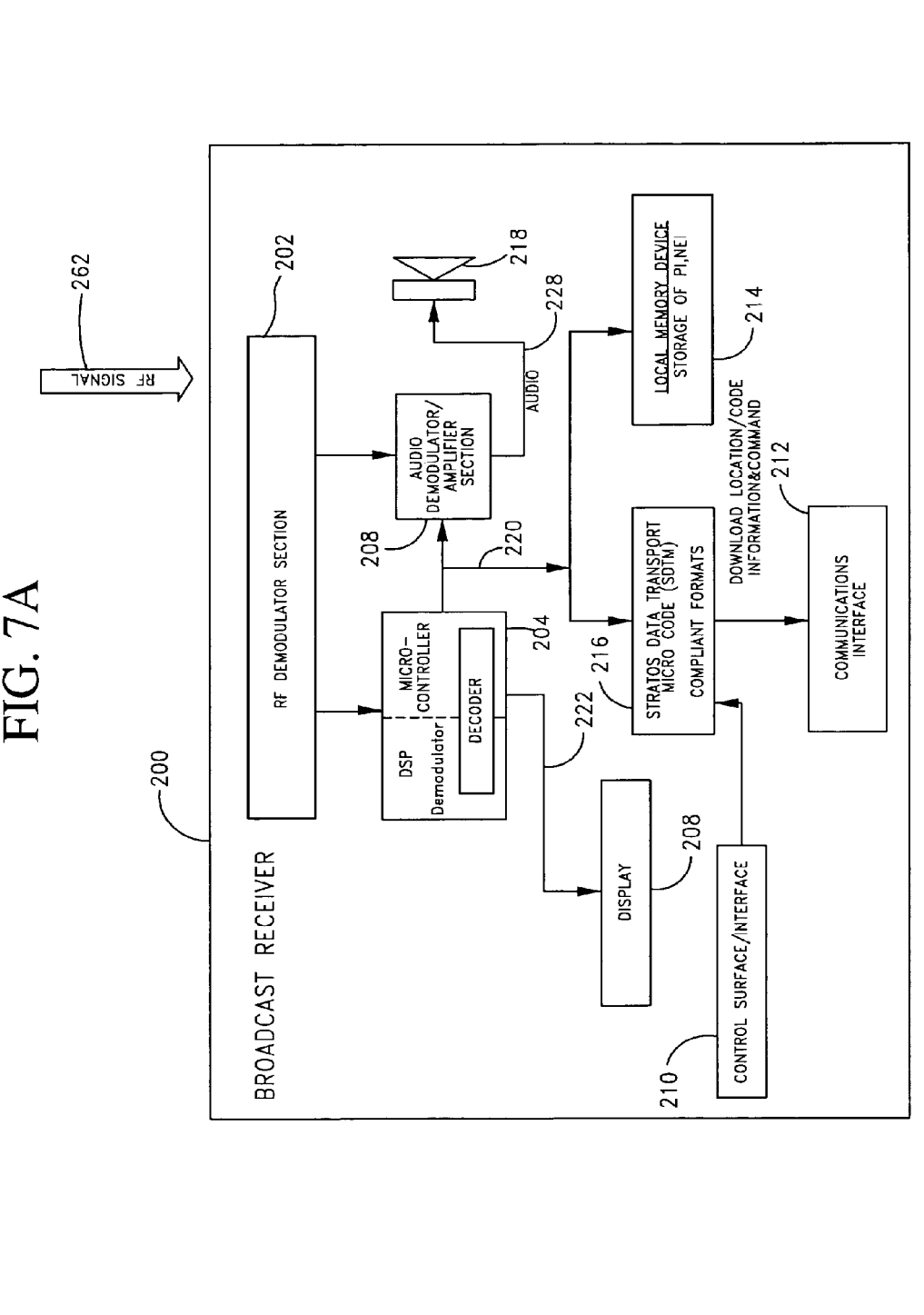
Figure 7B:
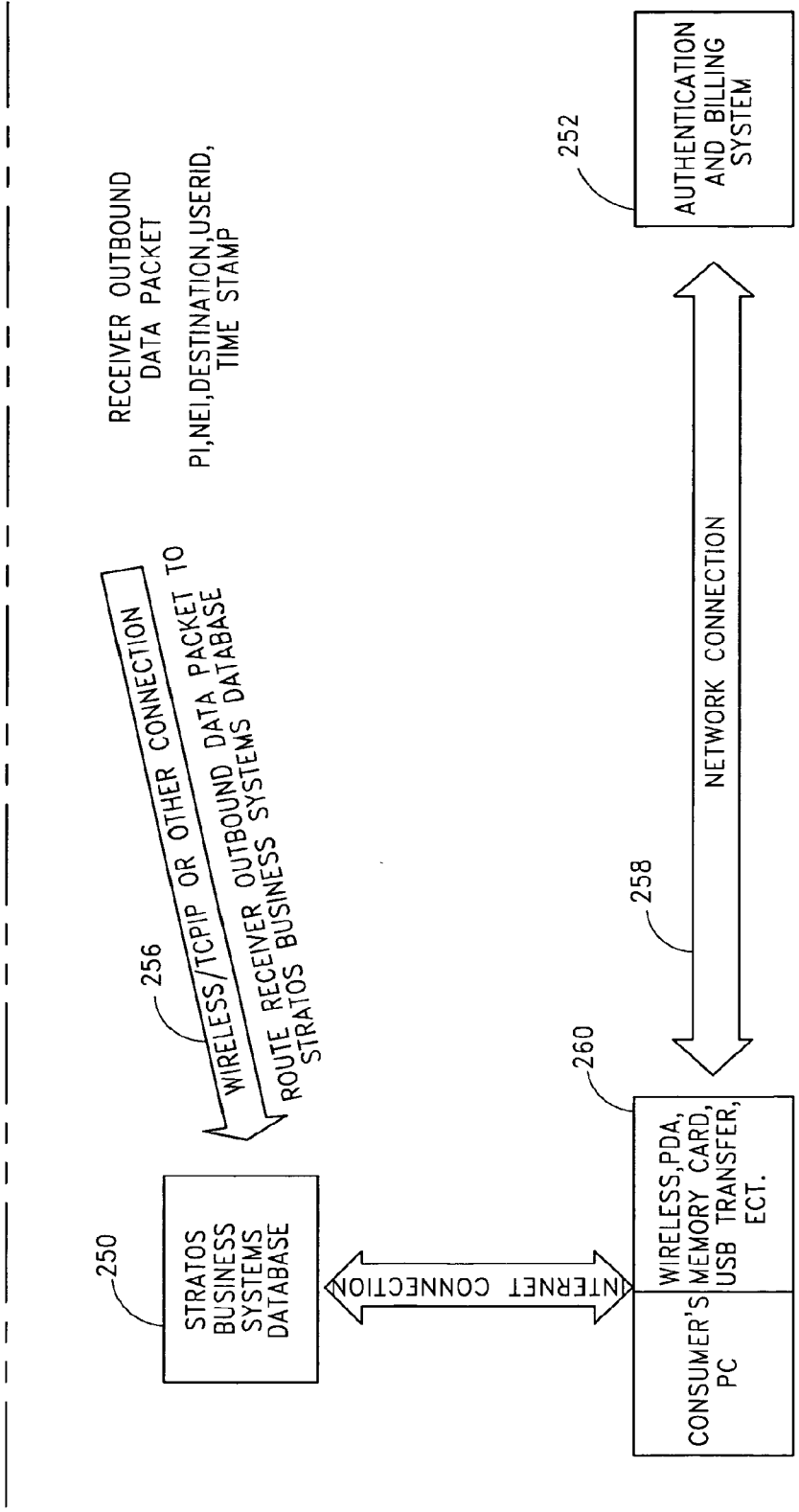

FIG. 7 illustrates an example of a broadcast receiver 200. A radio frequency (RF) demodulator 202 receives an RF signal 262 and separates the subcarrier signal from the main signal. The broadcast receiver 200 typically provides appropriate circuitry 208 for amplifying video or audio 228 from the main signal before presentation to the user 218, although it may be feasible to only use the subcarrier signal in some applications.

The broadcast receiver 200 provides the subcarrier signal to a subcarrier data extraction module 204. In one embodiment, the subcarrier signal conforms to the RDS standard.

In the illustrated embodiment, the data extraction module 204 uses a DSP (Digital Signal Processor) and a microcontroller to extract data from the RDS channel. The firmware code may reside in the DSP, the microcontroller, or baseband or a combination of the modules. The code receives and processes service data transported via a subcarrier signal to the receiver. The code may also contain an algorithm for receiving a variable allowing the receipt of a series of different service identifiers.

Activation of data processing is engaged by receipt of a service identifier or variable. This service identifier may reside in either the DSP, MC or baseband chip but may be found in any or all of the chips. The same identifier or variable is transported in the subcarrier signal in order to activate the process of decoding broadcast event identifiers and storing them in cache.

Figure 8A:
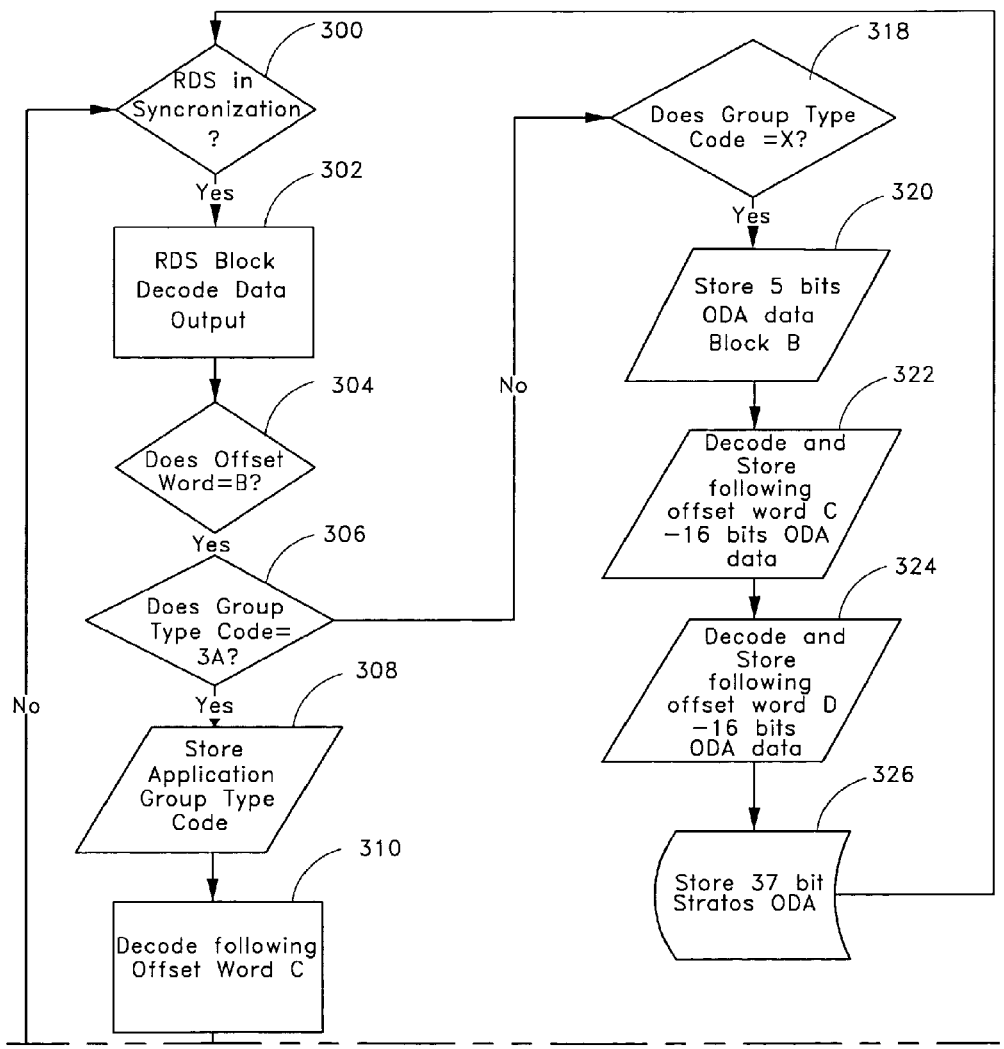
FIG. 8 (shown across FIGS. 8A and 8B) is a flow-chart diagram for extracting RDS data from the subcarrier channel.
Figure 8B:
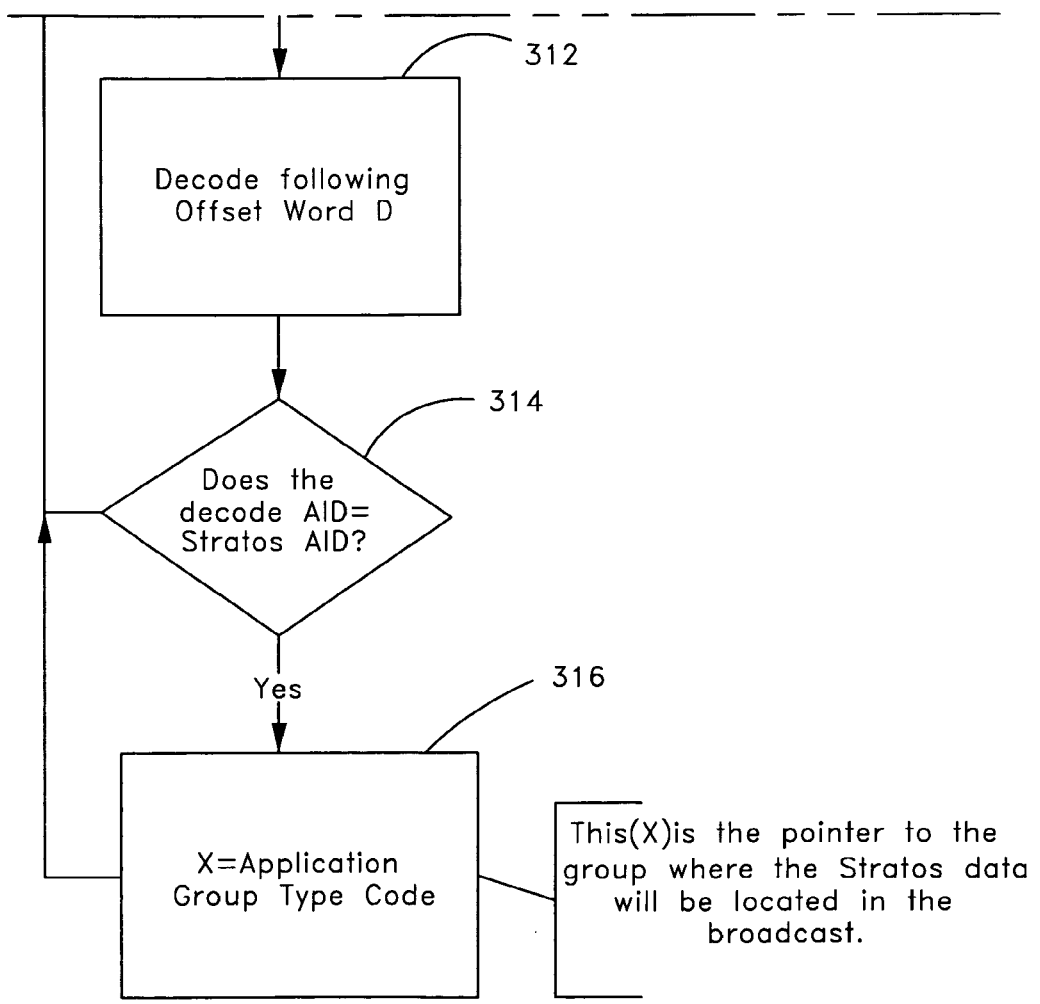

FIG. 8 is a flow-chart diagram for extracting RDS data from the subcarrier channel. At step 300, a received RDS signal is synchronized. After the signal is synchronized, the extraction module 204 can determine when a new block is received. The block data is decoded at step 302. The first block in a group contains the program identification. The extraction of the program identification from the first block (not shown) also occurs at step 302. The extraction module 204 checks for receipt of the second block at step 304. The extraction module checks to see if the group type code is 3A at step 306 if the second block was received at step 304. The extraction module 204 stores the Application Group type code at step 308 if a group type 3A was received. Otherwise, the extraction module 204 checks for a match of the group type code with a previously received Application Group type code at step 318.

If the Application Group type code was received at step 308, the extraction module 204 decodes the third and fourth blocks at steps 310 and 312, respectively. The extraction module 204, at step 314, compares the Application Identification code from block four with a predetermined Application Identification code associated with the event information extraction. If the Application Identification code is a match, the Application Group type code from block two is stored in memory at step 316.

Returning to step 318, a match of the group type code with a previously received Application Group type code indicates that the group contains broadcast data 126. The extraction module 204 extracts five bits from block 2 at step 320, 16 bits from block 3 at step 322, and 16 bits from block 4 at step 324. The resulting 37 bits are placed into memory at step 326. In addition to the 37 bits representing broadcast data 126, the extraction module 204 may place other identifying information such as the program service name ("PS"), program type ("PTY"), program identifier ("PI"), traffic program ("TP"), traffic announcement ("TA"), or time the group was broadcast into memory.

Figure 9:
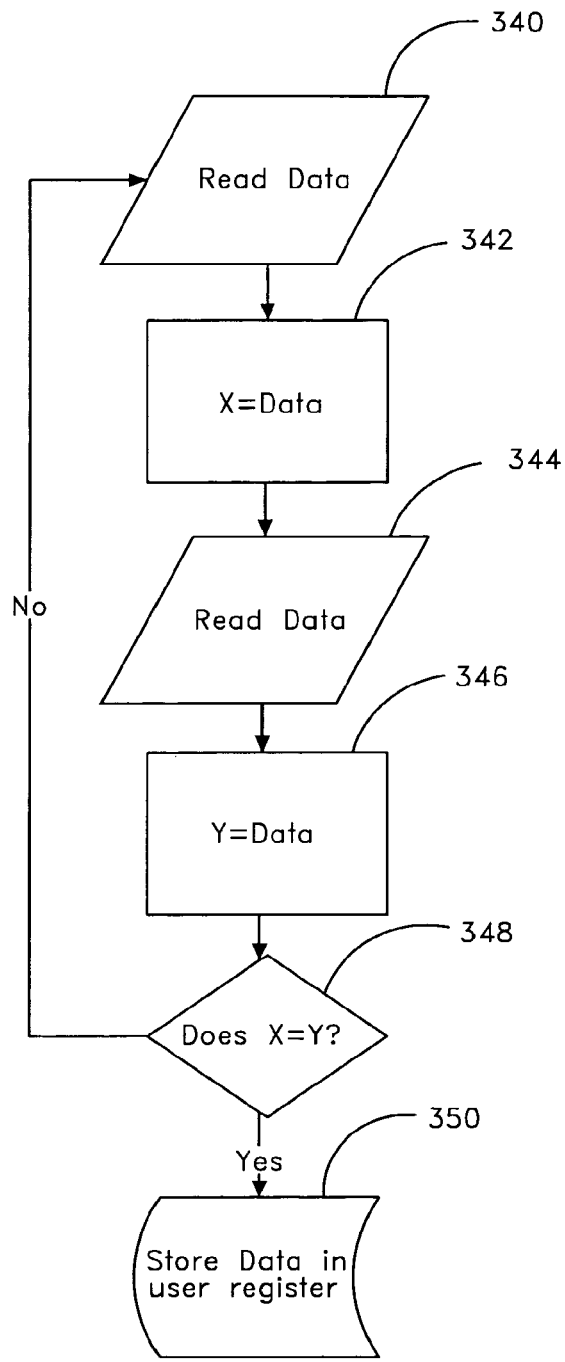
FIG. 9 illustrates a flow-diagram for performing double buffering.

The RDS standard includes support for error detection. The broadcast receiver 200 may apply an additional layer of error detection/correction by using, for example, double buffering. FIG. 9 illustrates a flow-diagram for performing double buffering. In this example, the same value is read in two or more consecutive ODA groups before being entered into memory. This technique does not rely on RDS error correction schemes, which can introduce errors. When synchronization is lost or the tuning frequency changes, the buffers may be cleared. Double buffering may also be used for other RDS features such as program identifier, program type, traffic program or traffic announcement. Multiple groups such as program service or radiotext can also be double buffered with the addition of a status flag that tells when the segments of data are through the double buffer. Once the segments are double buffered, the entire data element is stored.

As shown in FIG. 9, the first data is read at step 340. The first data is stored in location X at step 342. The second data is read at step 344. The second data is stored at location Y at step 346. If the first data in location X is the same as the second data in location Y at step 348, then the data is stored at step 350.

In some cases, the memory may contain previously received information about the broadcast data 126. For example, as explained previously, one embodiment broadcasts event data every second. Storing each of the repetitive broadcasts into memory results in inefficient use of the storage resources.

Even if the extraction module 204 stores only unique broadcast event data into memory, at some point the memory limits will eventually be reached. The extraction module 204 may advantageously purge old data or short term data from memory to make room for new data.

Keeping the extracted data in memory allows a user to review the broadcast event data even after the broadcast event is finished. Further, the memory allows a user to select from multiple options relating to a broadcast.

For example, a radio station conducting a survey may send one code for a "yes" response, and a second code for a "no" response. In another embodiment, a single broadcast event identifier may include coding to indicate that a yes/no question has been posed. For example, 4 bits of the broadcast event identifier could identify the category of the broadcast event, leaving the remaining 33 bits to uniquely identify the event. When the broadcast receiver 200 recognizes that the 4 bits correspond to a broadcast event category of a yes/no question, the broadcast receiver can then display the yes/no options to the user.

A user responding to the broadcast event causes the generation of a receiver outbound data packet. The receiver outbound data packet may contain, for example, RDS fields corresponding to broadcast station identification, a broadcast event identifier, a user identifier, or a time stamp. When responding to a yes/no question, the broadcast receiver 200 could change one or more bits of the broadcast event identifier to indicate the selection by the user from the available options. In this case, the broadcast event identifier contained in the receiver outbound data packet may not be identical to the broadcast event identifier received by the broadcast receiver 200. Alternatively, the receiver outbound data packet could include supplemental information indicating which selection the user chose from the available options.

In another embodiment, the radio station may pose a question with multiple choices available as the answer. The user can scroll through the choices to select the desired answer. Similarly, the radio station may broadcast multiple album titles by an artist currently on air. The listener can then select and purchase one or more of the various titles. In another embodiment, the user may express a "vote" by selecting a choice.

The broadcast data 126 may include supplemental text to accompany a broadcast event identifier. The text may be sent as part of the ODA group, or it may be sent using predefined RDS standards, such as the radiotext group type 2B. The broadcast receiver may also store the supplemental text in memory for display to the user.

User Response

Returning to FIG. 7, the broadcast receiver 200 may include a user interface. The user interface may include a display 208 and a response mechanism 210. In one embodiment, the display 208 receives display data from the subcarrier data extraction module 204. The display data 208 can include information such as the program service name and program type, or it can include radio text information or messages displaying purchase or response options. The display 208 may show several lines of text at once, or may display a single line. The user interface may also include mechanisms for the user to scroll through several lines, displaying one or more lines at a time. For example, the user interface may include buttons that allow a user to scroll up and down between lines of text. Further, the user interface may provide for scrolling horizontally across the display. This can occur automatically or may also be controlled through the user interface.

The user interface may include buttons, a touch pad, a keypad, a joystick, a mouse, speech recognition, or other mechanisms for entering a response. User responses may include, for example, selecting an item from the display, responding to a broadcast question, tuning into a different broadcast signal, turning a device on or off, or adjusting the broadcast signal volume. In one embodiment, the user is able to purchase a product by pressing a single button. In one embodiment, a response to the broadcast data 126 is sent without user involvement. This advantageously provides a mechanism for tracking demographic data.

The broadcast receiver 200 generates a response data packet corresponding to the user response. The response data packet includes information such as the program identifier, the broadcast event identifier, the location of the stored broadcast events or a user identifier. The response data packet may include other information such as the time of the user response, time of the event broadcast or the type of the user response (e.g., order, tune into different frequency, turn off broadcast receiver, or which button was pressed). Including the event broadcast time in the response data packet may help reduce errors in processing the response data packet.

In one embodiment, a broadcast data packet 126 provides the destination of the response data packet. In one embodiment, the destination may be transmitted in a separate ODA Group from the broadcast program related data. Using three consecutive transmissions of this separate ODA Group would allow the transmission of a destination address of up to 12 alphanumeric characters along with an identification of the address format (e.g., IP address or telephone number) The destination may be stored in non-volatile memory, such as flash memory. The broadcast receiver can then access the response data packet destination even after the power has been turned off. In another embodiment, the destination is periodically transmitted, and the broadcast receiver keeps user responses in a queue until the destination is received. The destination may be received separately from broadcast event data.

The destination may be combined or parsed into separate entities. For example, one entity may include the IP address of a server, and a second entity may include a location of a file or script on that server. This allows the IP address and file location to be updated independently. The IP address may be stored as a numeric identifier (typically four bytes) or as an alias that can be much larger. Thus, an updated server location can be transmitted by sending as few as four bytes as part of an update block. Similarly, the file location may also be updated with the transmission of an update block.

The update block may have its own ODA format, or it may be transmitted using the same ODA format as the broadcast event identifiers. As discussed previously, one or more bits may be used to specify the category of the event. Thus, four bits could be used to identify the category as an update block, and the remaining bits could be used to transmit the IP address or file location. Compression such as Huffman coding may be used to transmit the data. The data may be further limited to specific characters, such as the 26 letters of the English alphabet or special characters such as "/", "?", or ".".

The response data packet may be formatted in a variety of ways. Some example formats include Bluetooth, SOAP/XML, SMS (Short Message Service), MMS (Multimedia Messaging Service), GPRS (General Packet Radio Service), or Mobile Control Channel.

The user identifier may be uniquely assigned to the broadcast receiver or determined from another source. For example, a radio receiver in an automobile may communicate via an automobile communications bus, such as the MOST (Media Oriented Systems Transport) bus, to determine identifying information such as a vehicle identification number. Alternatively, the user identifier may be entered using the user interface. The user identifier may correspond to a credit card account or an identifier for some other payment system such as PayPal. The user identifier may also be determined from a communications interface 212. For example, the communications interface 212 may have the ability to communicate with a GSM (Global System for Mobile) wireless telephone and determine the telephone number from the Subscriber Identity Module (SIM). Certain hardware devices come with embedded identifiers such as a MAC address which may be queried and used as an identifier. General Packet Radio Service (GPRS) offers a continual connection through a wireless IP network for high speed data transmission. Thus, a data packet may be directed to an IP address using GPRS. The service provides its own IP address that may serve as an identifier. Alternatively, the communications interface 212 may include the ability to accept interface cards, such as a flash memory card, a credit card or credit card account information for storage within a SIM or other storage module. The user identifier could be, for example, a user name, a telephone number, an identifier from a third party, an electronic serial number (ESN), a wireless identification number (WIN), or a proprietary identifier.

Another embodiment uses the BlueTooth wireless specification with the Phone Access Profile (PAP) protocol stack specification. The PAP specification allows the use of a mobile phone or embedded phone in conjunction with a terminal device such as a cordless handset or car-kit installed in a car. The BlueTooth link provides wireless communication for remotely controlling the telephone by the terminal device. A PIN code may be used upon first use for initializing communication between the two devices. The PAP provides access to the subscriber number information, as well as other features such as call forwarding, call barring, or call waiting.

The broadcast receiver 200 may use a communications interface 212 for communicating the user response or other data to the data management module 110, and for receiving incoming data. The user response may be communicated at the time of the user response, or held in a staging area for later communication. The communications interface may provide adjustments for available bandwidth by transmitting the user responses as a single packet or a plurality of smaller packets. The amount of information pertaining to the user responses and transmitted over the communications interface may also be adjusted to the available bandwidth.

The communications interface 212 may use a variety of technologies, such as wireless technology, data storage mediums, or electronic connections. For example, a user response may cause the broadcast receiver 200 to initiate a communication using BLUETOOTH™ wireless technology with another device such as a wireless telephone. The broadcast receiver communicates the user response to the wireless telephone, which then communicates the user response to the data management module 110 (shown in FIG. 1). Other examples of technology for communicating the user response include code division multiple access (CDMA), time division multiple access (TDMA), Cellular Digital Packet Data (CDPD), transmission control protocol internet protocol (TCP/IP), modem, IEEE 802.11 wireless networks, short message service (SMS), Multimedia Messaging Service (MMS), general packet radio service (GPRS), or mobile control channel.

Alternatively, a port such as a 9-pin serial port, a USB port, Firewire, a parallel port or other port may provide connectivity between the broadcast receiver and other devices. Another embodiment uses flash card technology or other removable storage media. The removable storage media allows a user that does not have a connection to a wireless or landline network to store responses for later use. The ports or removable storage media provide connection to devices such as a personal computer, digital camera, wireless phone, personal computing device, kiosk, digital storage system or personal digital assistant.

In one embodiment, the communication interface 212 polls a wireless network until a good connection is obtained, at which point the selection data is transferred for completion of the transaction. In cases where the user cannot obtain a good connection or the user does not have a wireless account, the storage media can later be removed by the user and inserted into a personal computer. The personal computer then communicates the responses stored on the storage media to the data management module 110.

FIG. 7 illustrates an exemplary embodiment where the receiver outbound data packet is transmitted over a communications channel 256. The outbound data packet may include, for example, the PI, event identifier, destination for the data packet, user identifier, or time stamp. In the illustrated embodiment, the outbound data packet is communicated to a database 250 for further processing. The database 250 further communicates, using, for example, an internet connection, with a computer 260. The computer 260 may further communicate using a network connection 258 with an authentication and billing system 252.

Using the disclosed embodiments, the user can respond to a live broadcast radio advertisement to qualify for discounts, premiums or other sponsor-offered rewards. This system can also be applied to pledge drives employed by public radio stations, allowing listeners to pledge money while driving or listening to a portable radio. The system can also be used for listener polls where the broadcaster can obtain quick responses from listeners to new music, speech content or general questions such as a talk show format. The system can also be used for shopper incentive programs where a listener responds to an on-air event, data is passed to a third party database (i.e. a database maintained by a retail or grocery store), and the listener uses a club card to claim a discount or buy a product at the third party store. For example, a special premium may be provided to a listener because the listener is a club card holder that responded to the on-air event.

The user can also receive offers or hyperlinks posted on a personal web site presenting premiums such as discounted tickets (to events for the artists or writers for which they purchased content), suggestions of purchase for related artists or music genres, record company club offerings, or other premiums. Associated books, magazine articles, merchandise and event information can also be posted for the user to purchase. Hyperlinks can also be present for content not available on the radio but provided either through partnerships with existing digital content providers or content owners who have made direct arrangements for digital distribution through the data management module 110 or partner web site.

In one embodiment, a user's credit card number is stored on a SIM card such as is used in GSM telephones. This allows a user to pay for an item by pressing a button on the telephone without entering the credit card number. In another embodiment where the credit card number is not stored, the user is prompted to enter the credit card number on the GSM telephone or other wireless communications device. Alternatively, the user may pay, for example, by PayPal or a similar service, or the user may elect to have the purchases included in the wireless bill or internet service provider bill.

In one embodiment, the user receives delivery of purchased material over a wireless communication. Thus, a user can receive the purchased material while traveling. In one embodiment, the system also provides delayed delivery, when, for example: the user so chooses; the user does not have a wireless account; or the user cannot obtain a good signal with a wireless connection for transmission. In another embodiment, the purchased material is delivered to a location remote from the broadcast receiver. For example, the user may purchase material while listening to the radio, and that material may automatically be delivered to a home computer.

Alternatively, a user may, for example, press a button requesting more information about the broadcast event. Upon receipt of the additional information, the user may then make a decision regarding a purchase. The additional information may be reviewed, for example, on a website or on a wireless telephone.

In another embodiment, the material is delivered to a server for later communication to the broadcast receiver 200. For example, a user driving an automobile may request delivery of music to a wireless home network, such as a network conforming to IEEE 802.11. Then, upon parking the automobile within communication range of the wireless network, the requested music is transferred to the broadcast receiver 200 in the automobile. The broadcast receiver may contain a storage module 214 for storing delivered media content. The storage module 214 may also be used to store broadcast information such as the PI or event identifier such as a numeric event identifier (NEI). The storage module 214 may use, for example, flash memory, hard drive, CD-RW, DVD-RW, DVD+RW, or other storage mechanisms.

In another embodiment, the user receives a link to a download location on the internet. The link may be communicated to the broadcast receiver or to another location, such as an email address, that is accessible to the user. A user may also request that the material be delivered using traditional parcel mailing services.

As many users may not have a broadcast receiver 200 that includes the modules for decoding the broadcast data 126, the broadcast data 126 may advantageously be transmitted to a server for access over a network. Thus, a user listening to a broadcast may view, for example, a web page that displays choices representative of the choices shown on the display 208 of the broadcast receiver 200. A log of broadcast events may also be available on the web page.

The web page may also present items such as time or airing, artists, titles, pricing or advertisements with links to other pages. For example, an artist may be linked to a page that provides tour information or a title may provide a link for downloading a digital version of a song or purchasing a CD. Advertisements may be linked with a page that provides discounts, samples, or product purchase capability.

In order to protect the purchased content from piracy, various access-rights controls and copy-protections can be provided. In one embodiment, the user purchases a license to store a single copy of content to a CD or flash card. Additional licenses can be purchased through the data management module 102 without requiring additional downloads. File formats such as WMA (Windows Media Audio) from Microsoft provide built-in copy protection and are supported by many record labels.

User Services

FIG. 10 shows a sign-up interface 502 for entering user information. A user may sign up to participate in the program by providing the needed identification information. For example, the user may enter the name, telephone number, address, age, marital status, gender, household size, income, interests, user name, contact, or connection information. FIG. 11 shows an interface 504 for selecting user interests. In one embodiment, the user account is associated with an internet service provider (ISP) account or wireless carrier account.

The user may request notification of specified events, such as concert ticket availability, contests, songs of interest being aired, or other events of interest to the user. The notification may be sent, for example, by email, instant messaging, SMS or MMS. The user may forward notifications to friends or acquaintances. The user may be rewarded with some form of premium for forwarding the notification to others. The user may also be rewarded with a premium for each time an acquaintance forwards the message on to another user. In one embodiment, the messaging is tracked to determine the awards.

The user can set up a purchasing account to allow for the purchase of products. The purchasing account may be established through, for example, a wireless carrier, an internet service provider, a radio station website, a retail store kiosk or other third party billing service. The user may be provided with an End User License Agreement in order to use the services.

The sign-up interface may be customized for use with third parties. For example, an internet service provider could offer interactive radio services to its users by presenting the sign-up screen as part of the third party web-site.

FIG. 12 shows an interface 506 for customizing a ticket purchase program for a user. As shown, a user may indicate a favorite music venue. Information such as city or zip code may be used to determine the venues that participate in the program within a given area. The user may select a favorite seating section and favorite artists. Other options may include the number of seats, payment method or notification method. The user may pay, for example, by credit card or PayPal or other service, or the user may elect to have the purchases included in the wireless bill or internet service provider bill. This notification method selection allows the user to be notified when tickets become available for performances that the user may be interested in. For example, the user may be notified by wireless SMS, text messaging, email, or on the internet. A user may be provided with the option to purchase tickets when they become available.

The user may elect to participate in usage tracking regarding their response to on-air content for the collection of demographic data. The user may receive incentives such as frequent flyer awards or free music for using the system for allowing their usage to be tracked. A user may elect to receive discounts, product samples, trial programs and prizes related to the selected user interests.

A user may also track an account or summary of user responses by using, for example, a pager, website or wireless telephone. A use may review songs or advertisement events and message responses through the use of wireless technology such as SMS return codes. In one embodiment, the user accesses a web interface that provides information such as the day, time, artist, song title or advertisement event. The web interface may provide links for information such as tour information, purchasing options, download locations. Advertisements may be linked with a page that provides discounts, samples, or product purchase capability.

Events may be indexed with the ability to scroll forward or backwards as appropriate or be searchable through the use of input fields. In one embodiment the events are indexed by the broadcast identifier. In another embodiment the events are indexed by time. The events may further be indexed, for example, by hour blocks to more quickly review the events. Thus, a user wishing to review events that occurred between 7:40 and 7:50 may either scroll forward from 7:00 or backwards from 8:00.

Data Management

The data management module 110 communicates with the event database 128 the content database 134, a user database, and a response database. The user response packets can be monitored by the data management module 110. The data collected through "data mining" of user responses can be sold to companies interested in tracking demographic information and music sales such as record companies and trade publications. The tracking of user responses may be done in a way to keep the user anonymous.

Figure 13:
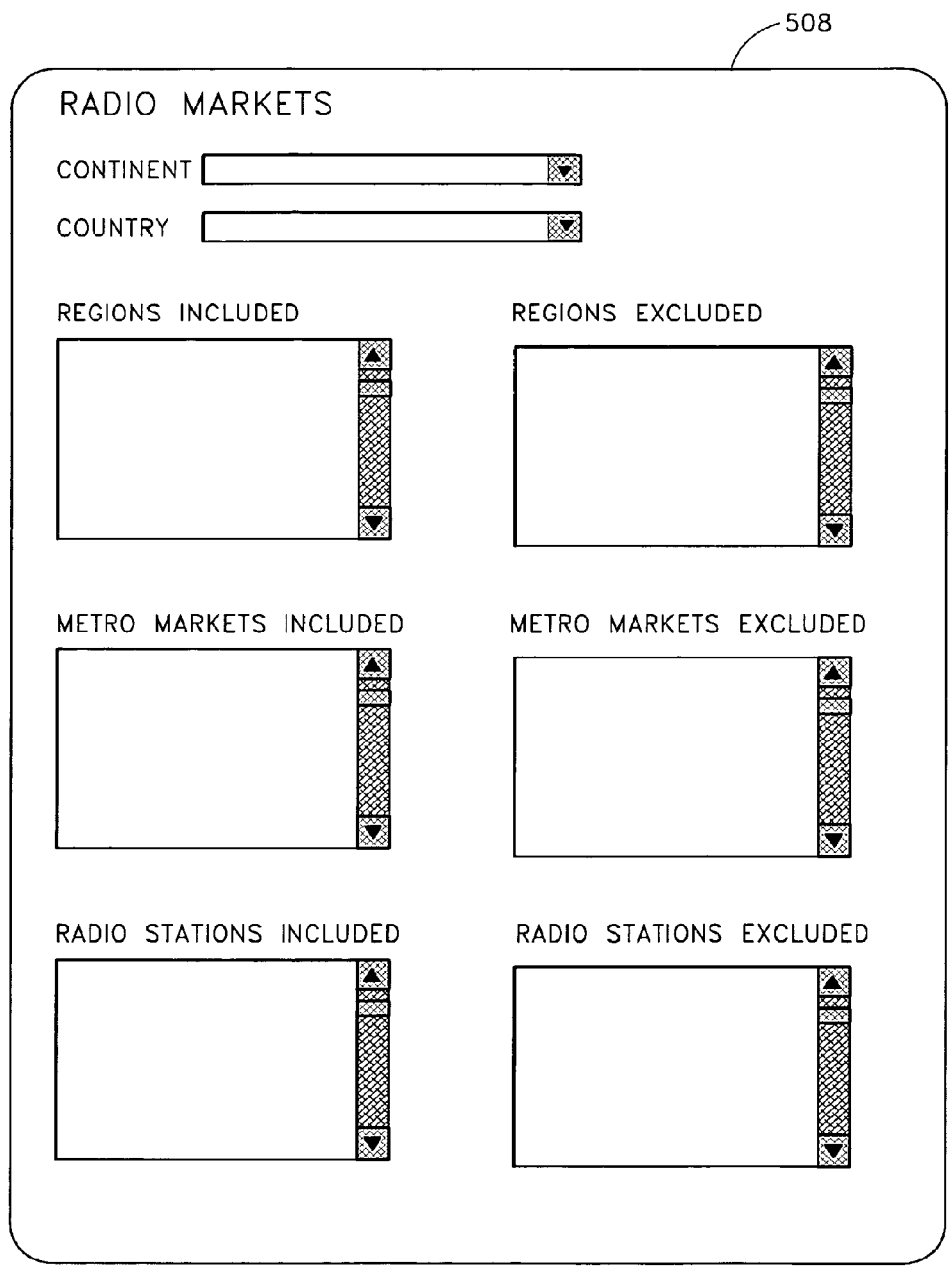
FIG. 13 shows a user interface for the data management module.

FIG. 13 shows a user interface 508 for the data management module 110, which allows for demographic tracking using a variety of parameters. The user interface may be tailored to specific user types, such as broadcasters, advertisers, or content providers.

The broadcaster may be interested in real-time reporting for one or more radio stations located in one or more areas. The broadcaster may select the areas and radio stations of interest. Other options may include searching by broadcast event, advertising campaign, artist, or other types of data such as those stored in the event database 128, the content database 134, the user database or response database.

The advertising campaign is identified, for example, by an Ad-ID or ISCI code as defined by the American Association of Advertising Agencies (AAAA) and the Association of National Advertisers (ANA). Ad-ID generates unique codes for advertisement identification, scheduling, placement, billing and verification purposes. Ad-ID is an alphanumeric code that is backwards compatible with the ISCI code. The data management module 110 may communicate with the AAAA database to identify advertisement campaigns. In one embodiment, the broadcast data preparation module uses the Ad-ID for generation of the broadcast event identifier.

Figure 14:
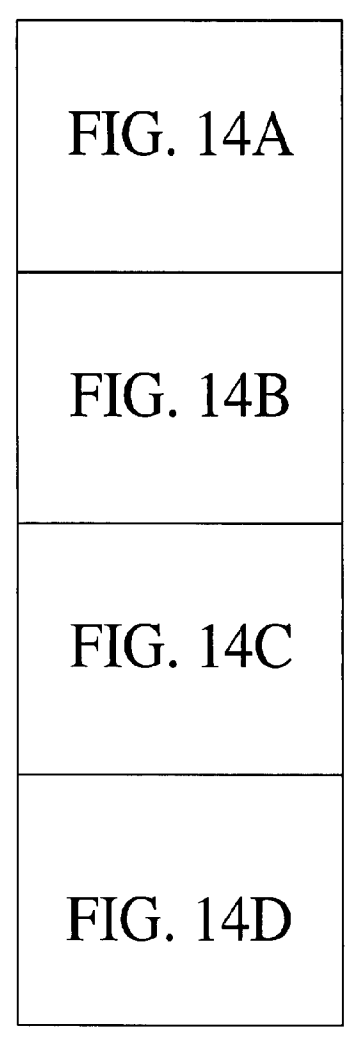
Figure 14B:
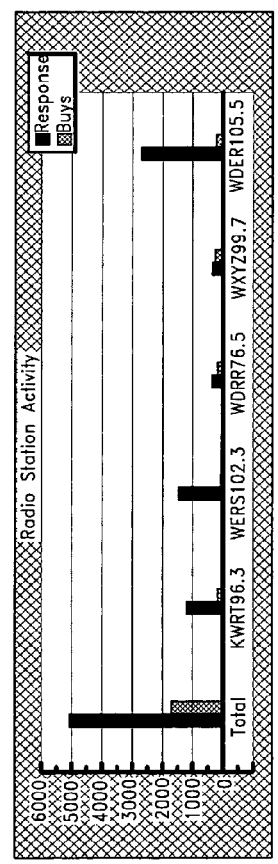
FIG. 14 (shown across FIGS. 14A-D) shows a user interface for generating reports from selected search criteria.
Figure 14C:
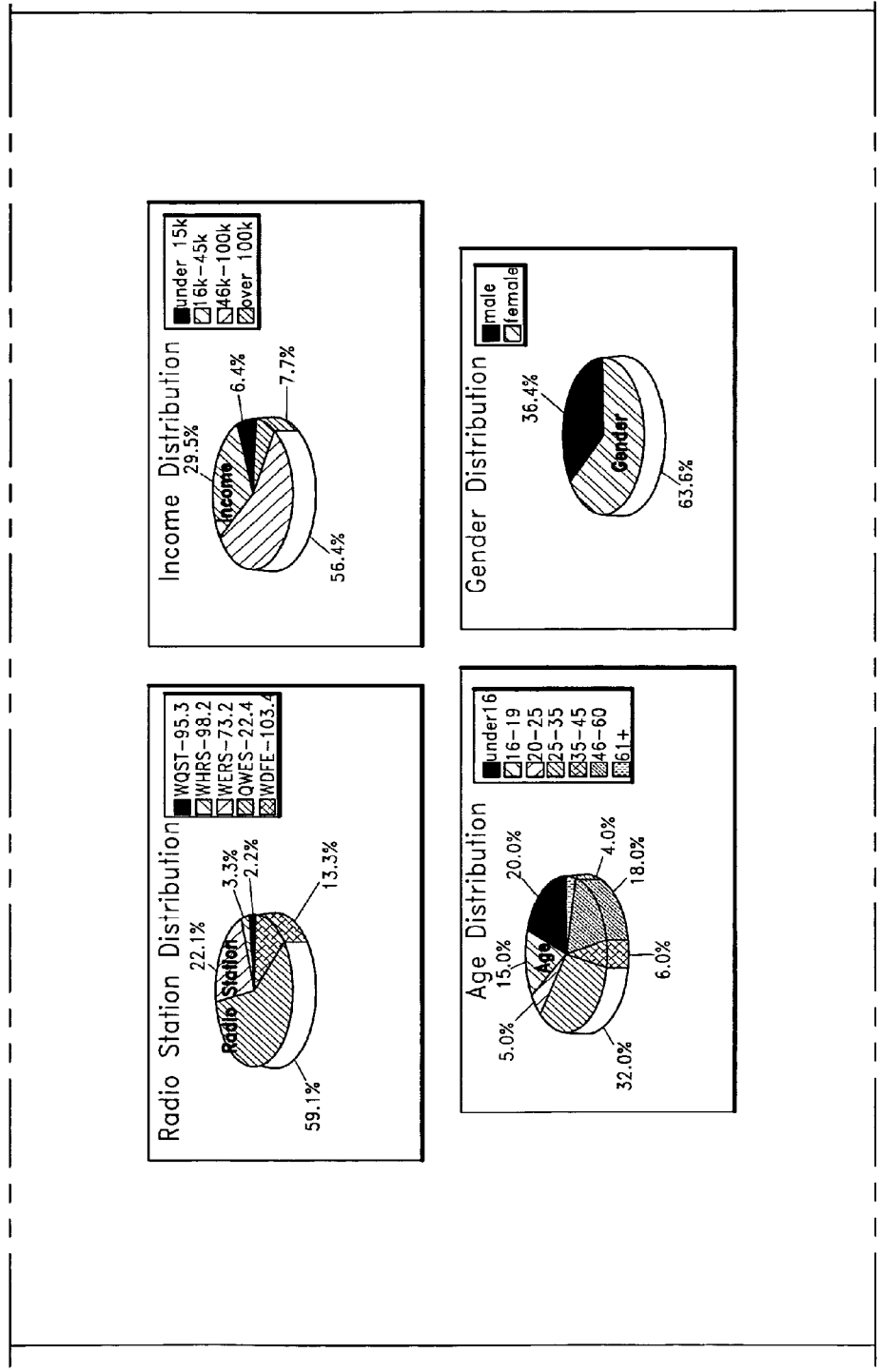
Figure 14D:
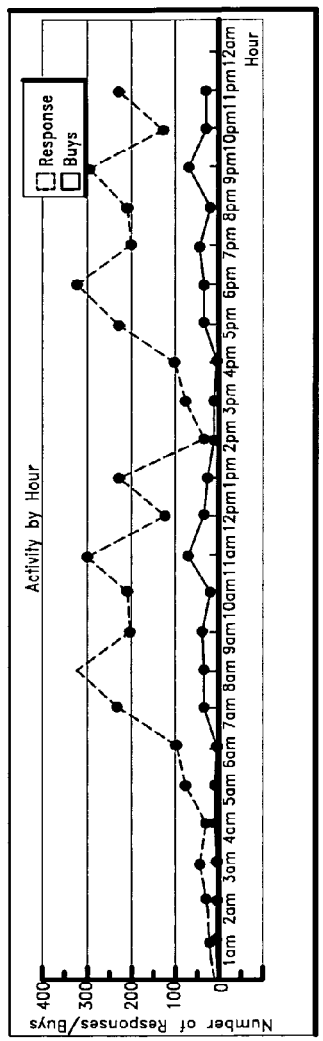
Figure 15A:
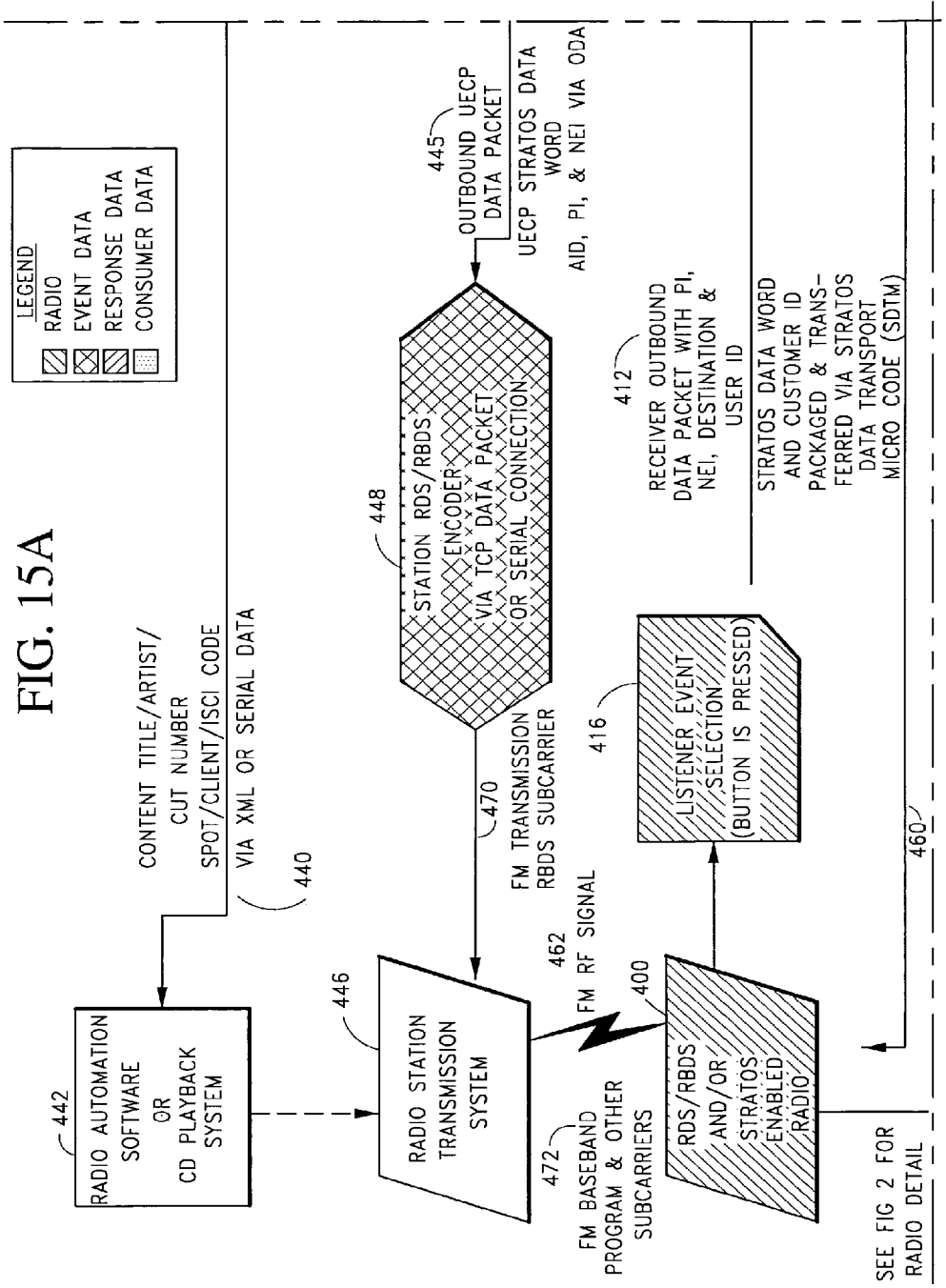
FIG. 15 (shown across FIGS. 15A-F) illustrates a flow diagram of a presently preferred embodiment of a broadcast response system.
Figure 15B:
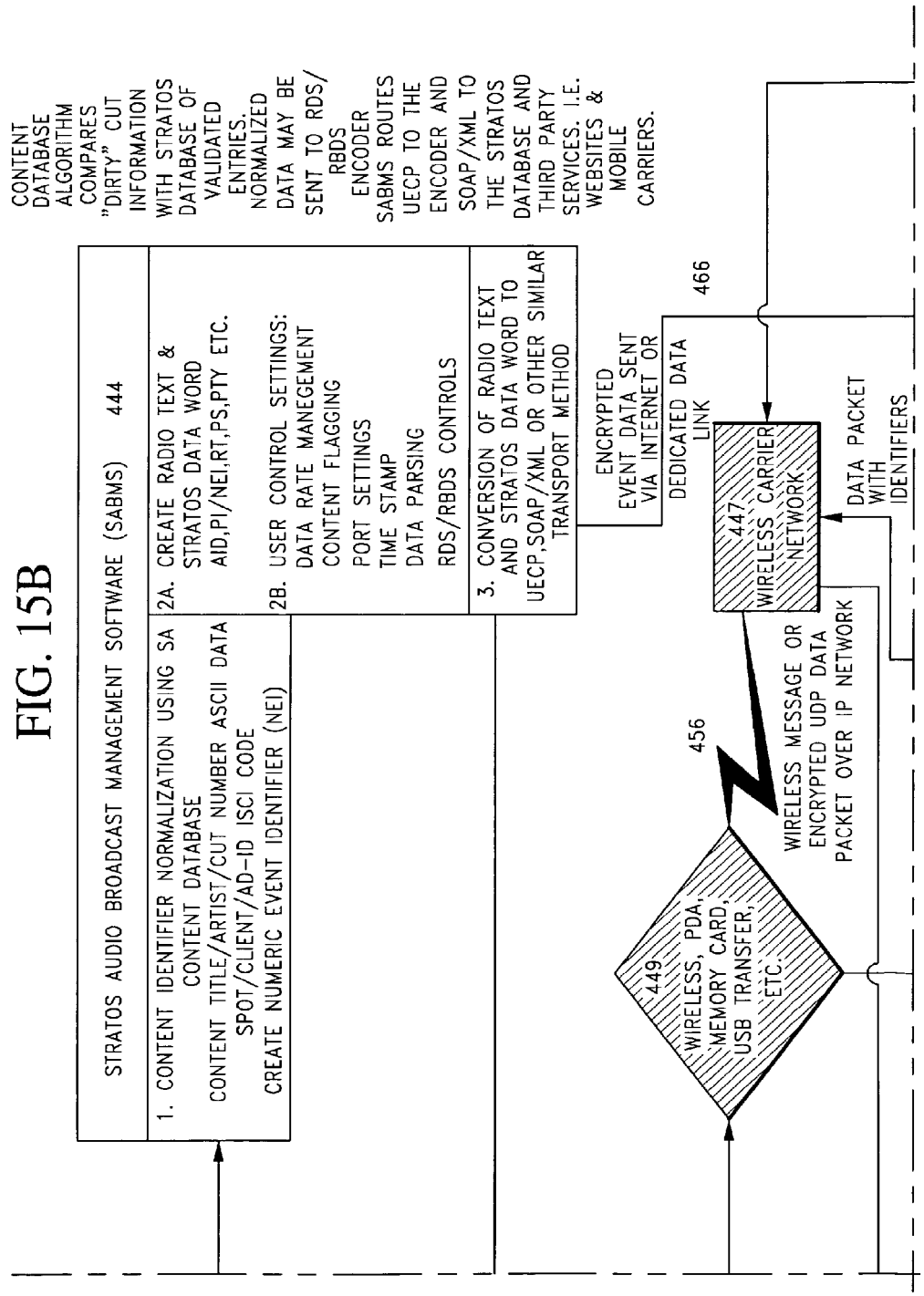
Figure 15C:
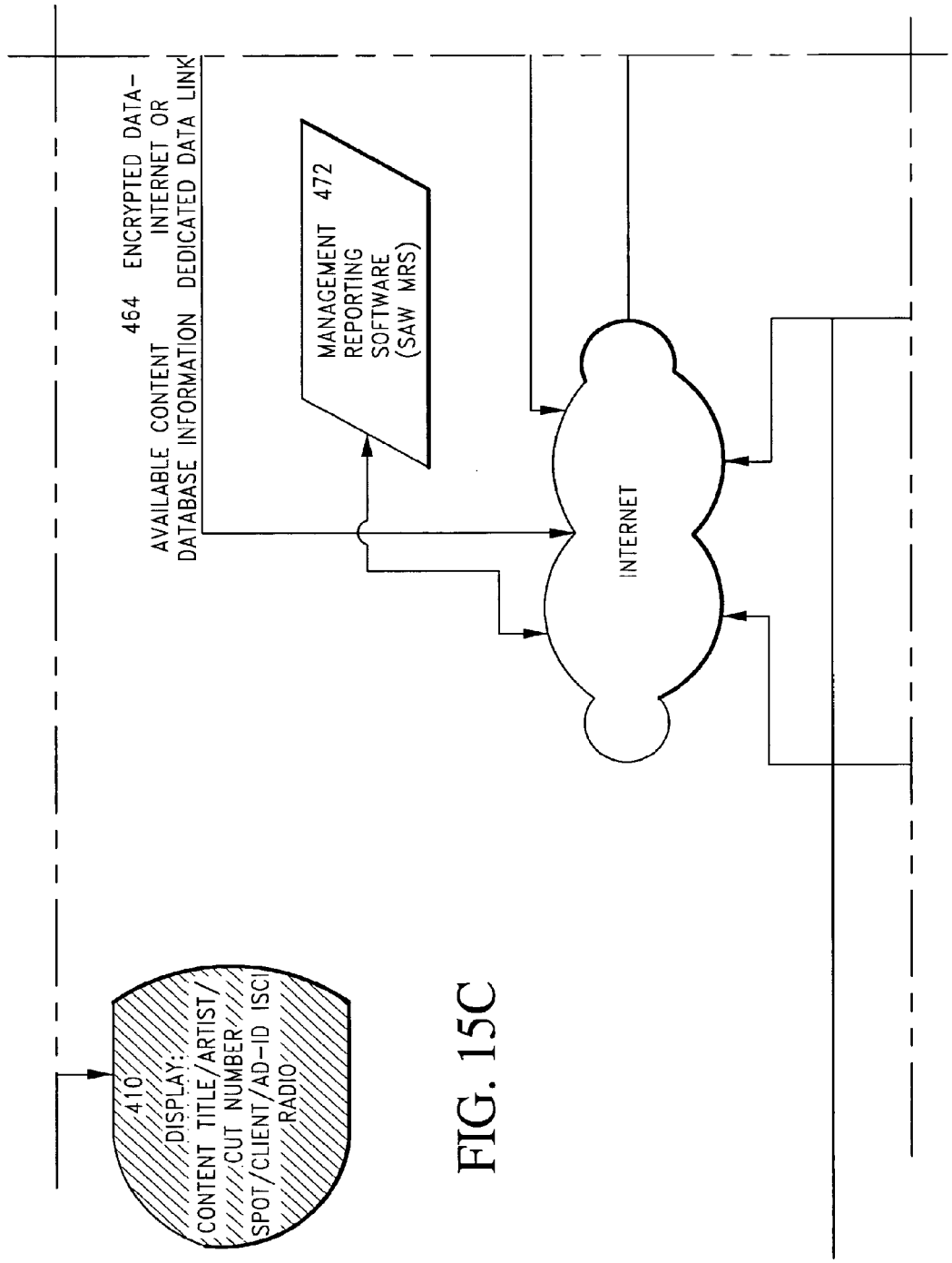
Figure 15D:
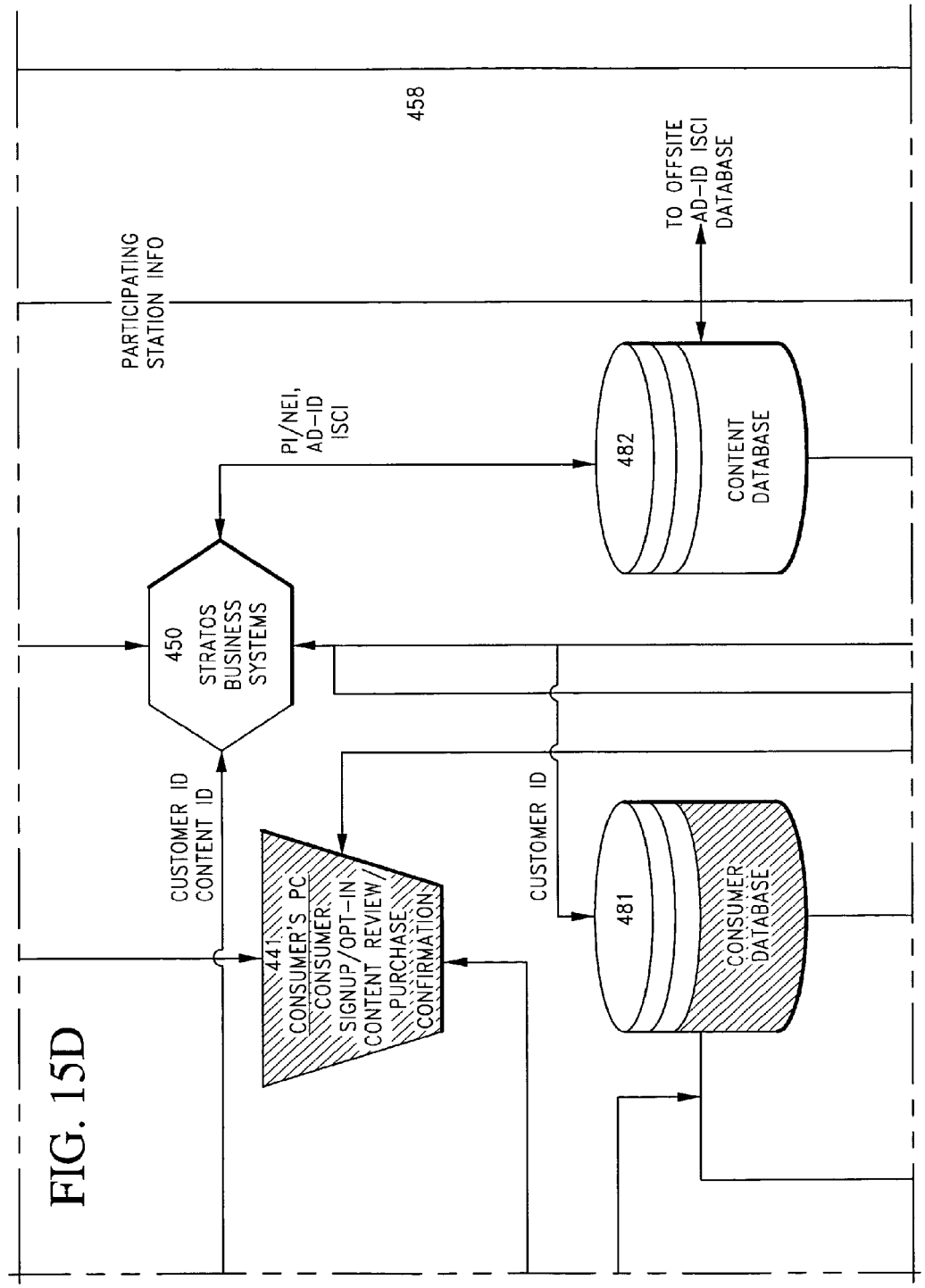
Figure 15E:
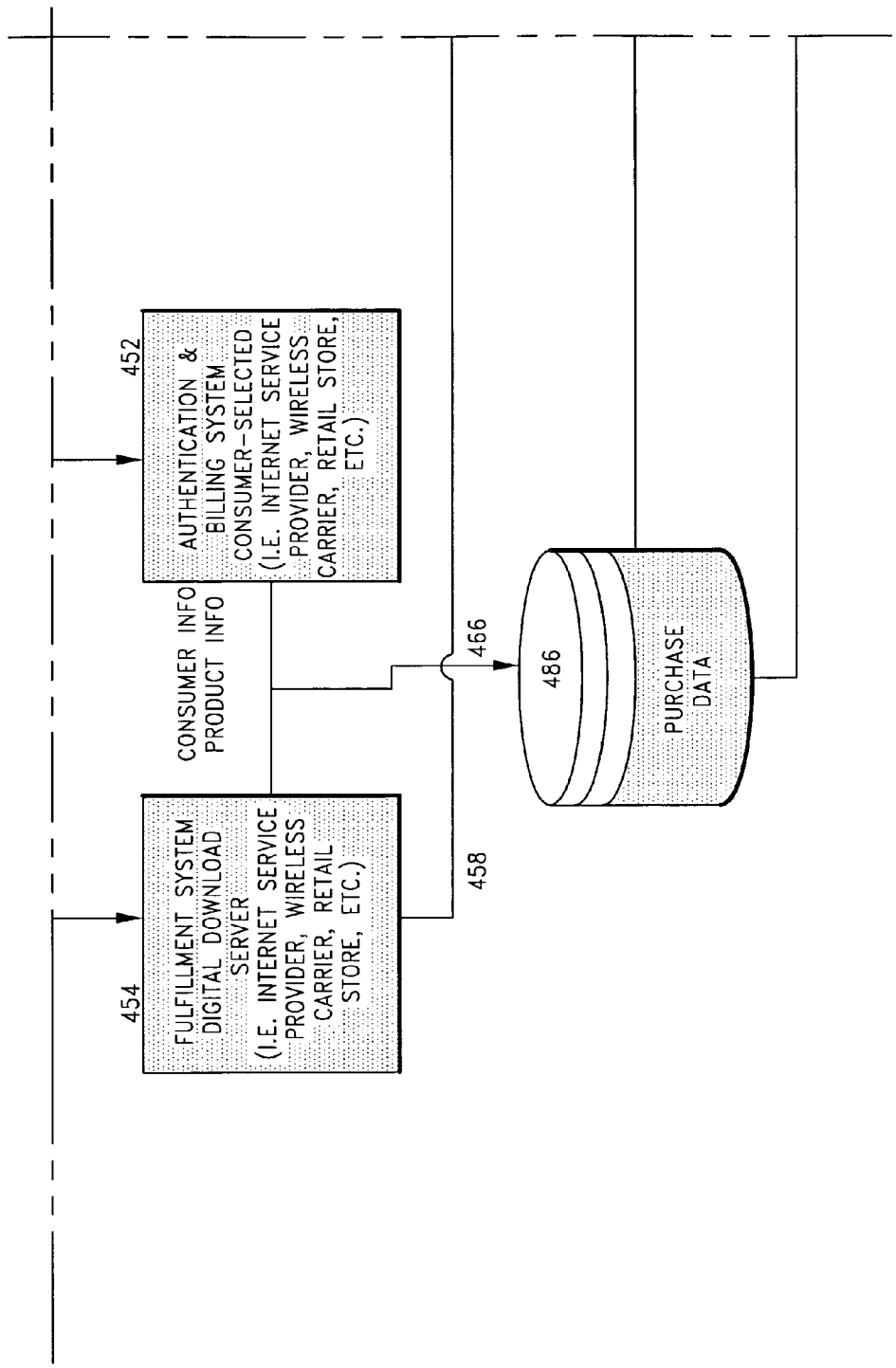
Figure 15F:
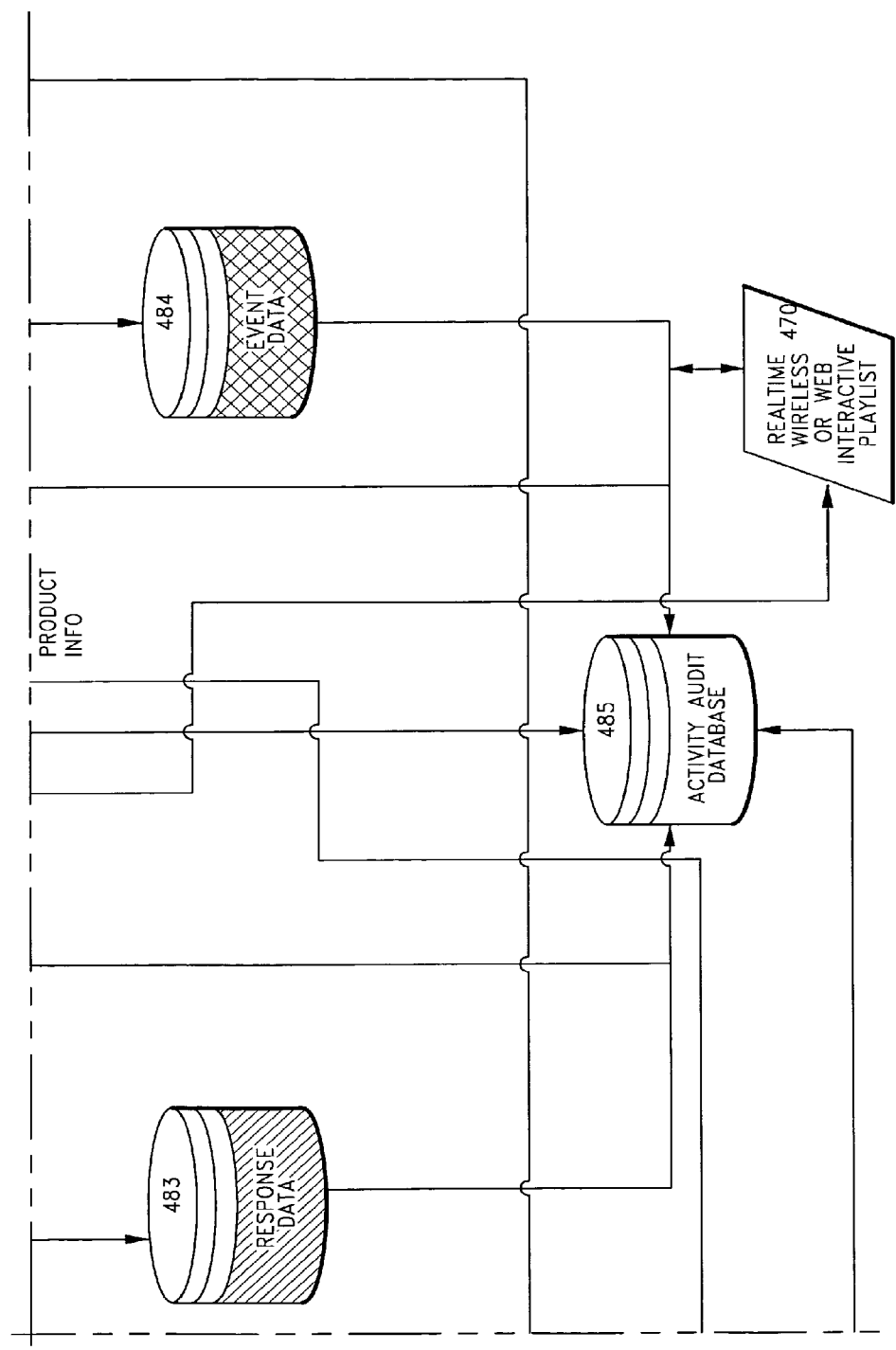

As shown in FIG. 14, the broadcaster may generate reports 510 from the selected search criteria. Real time reports track the broadcaster's audience by parameters such as gender, age, location, time, or redemption occurrence.

Similarly, an advertiser or content provider may desire to track user activity. For example, record companies and publishers can track number of plays or responses by market or markets for their products. They can track trends and monitor interactive responses.

Order Fulfillment

Requested content can be sent directly to the broadcast receiver 200 using wireless communications. Requested content can also be directed to a personal web page assigned to the user. Content may also be directed to a wireless device. The user can access the account over the Internet or via a wireless device, and the user can download purchased content to a personal computer or wireless device.

The data management module 110 matches the information sent from the user response data packet with information in the event database. The data management module 110 verifies the customer information and determines whether the customer account can be debited for the cost of the order. The data management module 110 then provides an approval signal indicating whether the purchase was approved.

FIG. 16 shows an exemplary interface 512 for displaying a playlist to a user.

Figure 17:
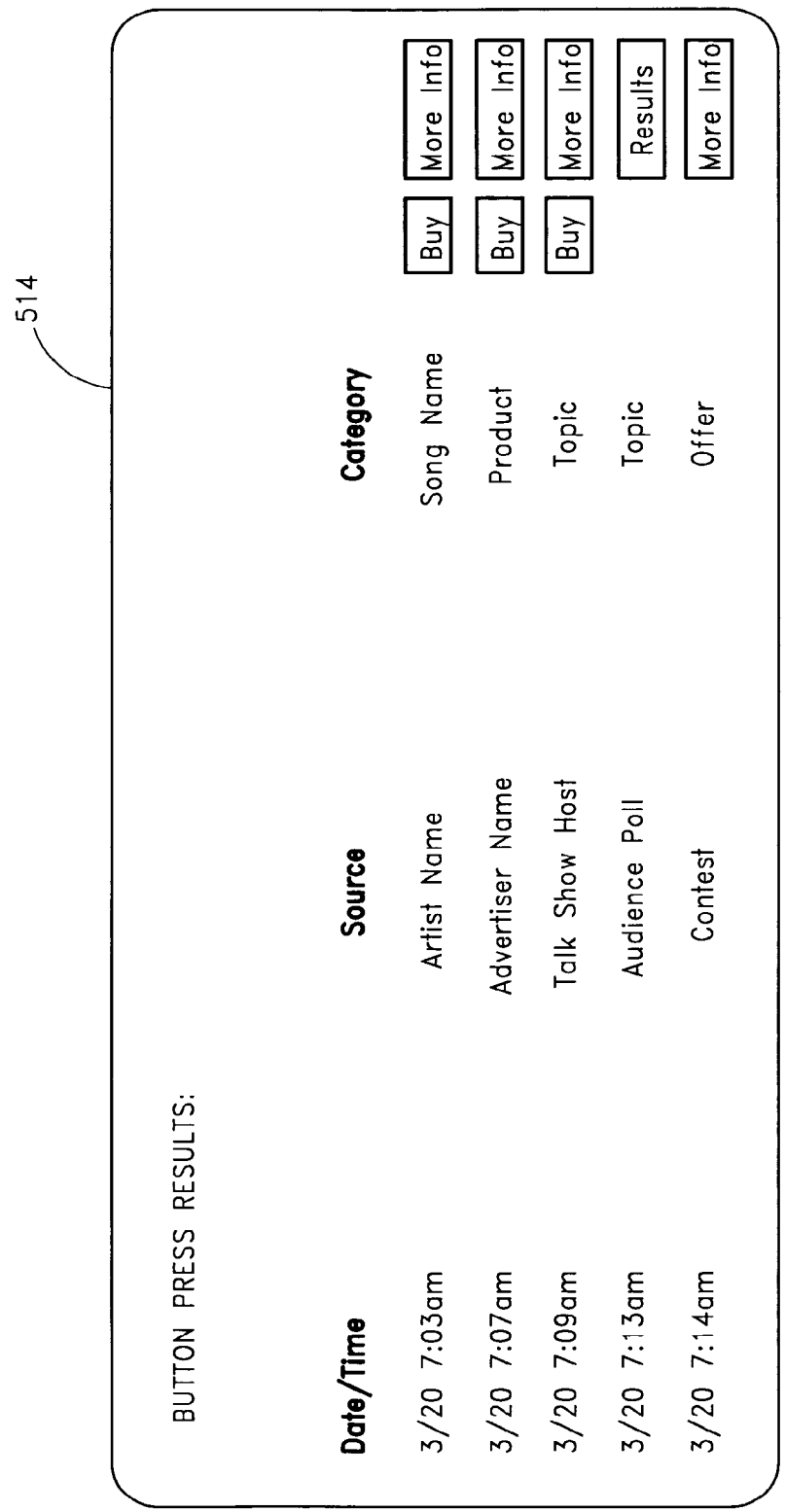
FIG. 17 shows an exemplary interface for redemption.

FIG. 17 illustrates a redemption screen 514. Users may establish single or multiple redemption points upon establishment of service. These might include a third party website, radio station website, wireless provider website, wireless phone, or other method of reviewing selections made by responding to on-air content.

One expression of redemption provides the user a secure web environment where all selections are presented as interne hyperlinks that when clicked upon, directs the user to a content source where the pricing, terms and delivery methods are available. In addition, related advertising, more associated information and offers may also be present. Users may gain points such as music points or frequent flyer miles for redemption activities.

Presently Preferred Embodiment

FIG. 15 illustrates a flow diagram of a presently preferred embodiment of a broadcast response system. As shown, radio automation software or a CD playback system 442 communicates content information 440 to a broadcast management module 444. The broadcast management module 444 compares the content information 440 with entries in the content database 482. The content information 440 is associated with a numeric event identifier (NEI). An outbound UECP packet 445 comprising, for example, AID, PI, NEI, RT, receiver outbound destination and PTY elements, is communicated to an RDS encoder 448. Similar information is communicated over a communications link 466 to an event database 484. The outbound UECP data packet 445 is formatted for use with the RDS subcarrier 470, and a baseband program with subcarriers 472 is transmitted by a radio station transmission system 446.

The transmitted RF signal 462 is received by an RDS-enabled radio 400, similar to the broadcast receiver 200 illustrated in FIG. 7. The radio includes a display 410 and a user interface 416. When a user responds to the broadcast, a receiver outbound data packet 412 is communicated to a communications device 449. The communications device 449 may transmit the receiver outbound data packet 412 using a wireless carrier network 447 to the stored outbound destination. Optionally, the radio may communicate with, for example, a personal computer 441. The wireless network 447 also allows for data to be uploaded to the radio 400. Thus, a user may order a digital song and have it uploaded to the radio. Optionally, the data uploaded to the radio could update the automotive software. In one exemplary embodiment, the receiver outbound data packet is communicated to a system management module 450. The system management module 450 is in communication with a consumer database 481, a response database 483, a content database 482, an event database 484, a purchase database 486, and an activity audit database 485. The event data and user responses may also be monitored in real time using a monitoring module 470. The system management module 450 may also be in communication with a fulfillment module 454 or a billing module 452. As is apparent from FIG. 15, many of these modules are interconnected or in communication with each other.

SUMMARY

One of ordinary skill in the art will recognize that there are various forms of media that can be broadcast. Where a specific type of media is described in the embodiments herein, it is for demonstration purposes only and the embodiments should not be limited in that regard. Some examples of the various types of media can include music, speech, text or video.

It should be understood that data transmission standards other than RDS, RBDS, DARC and DAB are also operable with the embodiments disclosed herein, and the scope of the disclosure should not be limited to those standards.

The system may include one or more of the following features: allow the user to establishes a "creative content" direct purchasing account or with a wireless carrier or other approved billing partner; provide a personal URL (web address) for the user to monitor account activity, enable or disable software downloads, display premiums offered by sponsors, manage and track responses using a broadcast receiver or a personal computer, makes routing choice between the broadcast receiver or the web account for content, make selection of compression type (e.g., WMA, MP3 (MPEG-1 Audio Layer 3), RA (Real Audio), Liquid Audio), opt-in to usage tracking programs where demographic data is collected by permission from user, opt-in to rewards and redemption programs where users can for example, accumulate frequent flyer miles for purchases and participation, receive automatic notification of tickets for events where users input a zip code which returns the concert venues in that location, purchase tickets, or select favorite artist, favorite section in the venue and payment method.

RDS/RDS is an FM-only transmission system but one of ordinary skill in the art will recognize that data can be included with other broadcast services. For example, use of dual tuners in a radio allows the RDS/RDS data to be passed down the FM subcarrier in association with an AM station. When a user response occurs, the broadcast receiver 200 references the data captured from the FM signal and returns it in the response data packet.

Digital Audio Broadcasting (DAB), which includes flexible, open-source, data transmission functions along with the audio signal. Systems for adapting digital audio and data transmission to the current allocation of AM and FM stations using a technique known as In Band On Channel (IBOC) are known. IBOC includes an ancillary data stream in the broadcast signal to be used by the station for whatever purposes they see fit. The ancillary data stream signal can be used to carry broadcast data 126 information.

Other developing radio systems also include a data path that can be used to send the information to successfully allow the acquisition of music or other material being broadcast. Satellite DAB providers, such as XM Satellite and Sirius Satellite Radio, have access to the audio and ancillary data signals being sent to compatible receivers.

As other audio services develop, the capability to transmit complimentary, simultaneous data can be used with no significant change in the overall system.

Wireless technology and the related developments in high-speed Internet access using systems such as BlueTooth or other wireless network technology allows faster downloads of the desired material by taking advantage of the newer, faster technology.

NTSC (National Television System Committee), PAL (Phase Alternating Line) and other technologies employed to transmit television signals around the world allow for similar capabilities in transmitting subcarrier data within the carrier signal.

The specific embodiments described herein are merely illustrative. Although described in terms of certain preferred embodiments, other embodiments that are apparent to those of ordinary skill in the art, including embodiments which do not provide all of the benefits and features set forth herein, are also within the scope of this invention.

Accordingly, it is to be understood that the patent rights arising hereunder are not to be limited to the specific embodiments or methods described in this specification or illustrated in the drawings, but extend to other arrangements, technology, and methods, now existing or hereinafter arising, which are suitable or sufficient for achieving the purposes and advantages hereof.

What is claimed is:

1. A system for generating and transmitting a response packet subsequent to receiving a broadcast of a specific broadcast event, the system comprising:
   a receiver that receives the broadcast of the specific broadcast event and a data stream corollary to the specific broadcast event;
   one or more processors that extract an event identifier from a portion of the data stream, the event identifier comprising at least a portion of data that enables identification of the broadcast of the specific broadcast event;
   an electronic storage medium that stores the event identifier;
   an electronic display that displays identifying information corresponding to the broadcast of the specific broadcast event,
   wherein the one or more processors further:
      detect a selection corollary to at least part of the identifying information displayed corresponding to the broadcast of the specific broadcast event,
      determine an association for the selection of at least part of the identifying information corollary to the event identifier stored in the electronic storage medium, and
      prepare the response packet for communication, the response packet comprising at least a result of the association of the selection of the at least part of the identifying information corollary to the event identifier; and
   a transmitter that transmits the response packet to a response authentication system, the response packet comprising at least the result of the association of the selection of the at least part of the identifying information corollary to the event identifier.

2. The system of claim 1, wherein the response packet further comprises data that enables an identification of a source of the response packet, the data that enables the identification of the source of the response packet including at least one of the following: a network address, a telephone number, an electronic serial number, a wireless identification number, a third party identifier, a vehicle identification number, an account identification, an identification of the system, an identification of a user of the system, a proprietary identifier.

3. The system of claim 1, wherein the data stream and the broadcast of the specific broadcast event are associated by at least one of the following: the data stream is received independently from the broadcast of the specific broadcast event, the data stream is frequency multiplexed with the broadcast of the specific broadcast event, the data stream is time multiplexed with the broadcast of the specific broadcast event, the data stream is encoded in the broadcast of the specific broadcast event, a first portion of the data stream is received independently from a second portion of the data stream, whereby the first portion of the data stream and the second portion of the data stream are corollary to the specific broadcast event.

4. The system of claim 1, wherein receiving the broadcast includes using at least one of the following: an FM radio receiver, an AM radio receiver, an In-Band-On-Channel receiver, a television receiver, a wireless receiver, a computing device, a satellite receiver.

5. The system of claim 1, wherein at least a portion of the data stream comprises, associated with the broadcast of the specific broadcast event, at least one of: a content identification, a track identifier, a track title, a numeric identifier, an alpha-numeric identifier, a unique identifier, Radio Broadcast Data System (RBDS) data, a plurality of response options, Open Data Application (ODA) data, program associated data.

6. The system of claim 1, wherein the event identifier extracted from the data stream is sourced from a database system and the response authentication system is capable of querying the database system using the event identifier.

7. A system for generating and transmitting a response packet corollary to an event identifier, the response packet comprising at least a type indication, the system comprising:
   a receiver that receives a broadcast of a specific broadcast event and a data stream corollary to the specific broadcast event;
   one or more processors that extract an event identifier from at least a portion of the data stream, the event identifier comprising the type indication and at least a portion of data that enables identification of the broadcast of the specific broadcast event;
   an electronic storage medium that stores the event identifier;
   an electronic display that displays at least one option corresponding to the broadcast of the specific broadcast event, the at least one option derived at least in part from the type indication,
   wherein the one or more processors further:
      detect a selection of the at least one option presented,
      update at least a portion of the event identifier corollary to the selection of the at least one option presented, and
      prepare the response packet for communication, the response packet comprising at least the portion of the event identifier that has been updated; and
   a transmitter that transmits the response packet to a response authentication system.

8. The system of claim 7, wherein the response packet further comprises data that enables an identification of a source of the response packet, the data that enables the identification of the source of the response packet including at least one of the following: a network address, a telephone number, an electronic serial number, a wireless identification number, a third party identifier, a vehicle identification number, an account identification, an identification of the system, an identification of a user of the system, a proprietary identifier.

9. The system of claim 7, wherein the data stream and the broadcast of the specific broadcast event are associated by at least one of the following: the data stream is received independently from the broadcast of the specific broadcast event, the data stream is frequency multiplexed with the broadcast of the specific broadcast event, the data stream is time multiplexed with the broadcast of the specific broadcast event, the data stream is encoded in the broadcast of the specific broadcast event, a first portion of the data stream is received independently from a second portion of the data stream whereby the first portion of the data stream and the second portion of the data stream are corollary to the specific broadcast event.

10. The system of claim 7, wherein the transmitter uses at least one of the following: a wireless connection, an interface with a computing device, a removable electronic storage medium.

11. The system of claim 7, wherein the event identifier extracted from the data stream is sourced from a database system and the response authentication system is capable of querying the database system using the event identifier.

12. The system of claim 7, wherein the type indication indicates at least one of a plurality of options that are enabled for the selection.

13. A system for identifying media content, the system comprising:
- a receiver that receives a data stream associated with a broadcast of a media content, the data stream comprising one or more identifiers;
- a processor that extracts, from the one or more identifiers, data comprising at least one of the following: a media content element including information about the media content, a source element including information about a source of the broadcast of the media content, a source element including information about a source of the data stream, a reference code;
- an electronic storage medium that stores the data extracted from the one or more identifiers, the data extracted from the one or more identifiers comprising at least one of the following: the media content element including information about the media content, the source element including information about the source of the broadcast of the media content, the source element including information about the source of the data stream, the reference code;
- a transmitter that transmits a system initiated query data packet to an electronic database system, whereby the system initiated query data packet includes at least one of the following: an identification of the source of the broadcast of the media content, an identification of the source of the data stream, the reference code, the media content element, the source element; and
- the receiver further receives an interactive response from the electronic database system, the interactive response including a response packet comprising a result of a query based on the system initiated query data packet.

14. The system of claim 13, wherein extracting from the one or more identifiers comprises identifying at least one of the following: a specific broadcast of the broadcast of the media content, a title of the media content, a name of an artist associated with the media content, a composer of the media content, a program associated with the media content, an advertisement associated with the media content, an identifier of the source of the media content.

15. The system of claim 13, wherein the data stream and the broadcast of the media content are associated by at least one of the following: the data stream is received independently from the broadcast of the media content, the data stream is frequency multiplexed with the broadcast of the media content, the data stream is time multiplexed with the broadcast of the media content, the data stream is encoded in the broadcast of the media content, a first portion of the data stream is received independently from a second portion of the data stream whereby the first portion of the data stream and the second portion of the data stream are corollary to the specific broadcast event.

16. The system of claim 13, wherein the transmitter further transmits, based on the media content element, a selection to at least one of the following: a source of the media content, the electronic database system, a source of the data stream, an advertiser, a services provider, a content provider, a wireless provider, an internet service provider.

17. The system of claim 16, wherein the selection is based at least partially on data received in the response packet.

18. The system of claim 13, wherein the system initiated query data packet transmitted to the electronic database system further includes at least one of the following: a network address, a telephone number, an electronic serial number, a vehicle identification number, an account identification, an identification of the system, an identification of a user of the system.

19. The system of claim 13, wherein the one or more identifiers of the data stream are sourced from the electronic database system.

20. The system of claim 13, wherein at least a portion of the data stream is synchronously stored in the electronic database system in association with the broadcast of media content.

\* \* \* \* \*